United States Patent
Wei et al.

(10) Patent No.: US 12,556,701 B2
(45) Date of Patent: Feb. 17, 2026

(54) DECODING METHOD, ENCODING METHOD AND APPARATUS

(71) Applicant: HANGZHOU HIKVISION DIGITAL TECHNOLOGY CO., LTD., Hangzhou (CN)

(72) Inventors: Liang Wei, Hangzhou (CN); Fangdong Chen, Hangzhou (CN); Li Wang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/709,088

(22) PCT Filed: Nov. 10, 2022

(86) PCT No.: PCT/CN2022/131068
§ 371 (c)(1),
(2) Date: May 10, 2024

(87) PCT Pub. No.: WO2023/083245
PCT Pub. Date: May 19, 2023

(65) Prior Publication Data
US 2024/0430426 A1 Dec. 26, 2024

(30) Foreign Application Priority Data
Nov. 11, 2021 (CN) .......................... 202111334223.8

(51) Int. Cl.
*H04N 19/124* (2014.01)
*H04N 19/172* (2014.01)
*H04N 19/186* (2014.01)

(52) U.S. Cl.
CPC ......... *H04N 19/124* (2014.11); *H04N 19/172* (2014.11); *H04N 19/186* (2014.11)

(58) Field of Classification Search
None
See application file for complete search history.

(56) References Cited

U.S. PATENT DOCUMENTS 9,161,046 B2 * 10/2015 Van der Auwera .... H04N 19/14
10,448,056 B2 * 10/2019 Li .......................... H04N 19/61
(Continued)

FOREIGN PATENT DOCUMENTS

CN 107431797 A 12/2017
CN 109479139 3/2019
(Continued)

OTHER PUBLICATIONS

Notice of Allowances in Chinese Appln. No. 202111334223.8, mailed on Dec. 4, 2024, 8 pages (with English translation).
(Continued)

*Primary Examiner* — Mohammad J Rahman
(74) *Attorney, Agent, or Firm* — Fish & Richardson P.C.

(57) ABSTRACT

A decoding method and apparatus, and an encoding method and apparatus for a picture are provided, and relate to the field of video encoding and decoding. The decoding method includes: analyzing a code stream to obtain one or more picture frames, wherein a picture frame comprises one or more coding units (CUs); determining a plurality of quantization parameter (QP) values for the picture frame, wherein a CU comprises a plurality of quantization groups (QGs), and a QG corresponds to a QP value; and decoding the picture frame based on the plurality of QP values.

12 Claims, 7 Drawing Sheets

S1010, for each of the plurality of QP values, obtain a Qstep corresponding to the QP value S1020, obtain a level value included in a QG corresponding to the QP value S1030, perform a dequantization on the level value of the QG based on a combination of quantizers selected

(56) References Cited

U.S. PATENT DOCUMENTS

| | | | |
|---|---|---|---|
| 10,904,529 B2* | 1/2021 | Chao | H04N 19/119 |
| 2010/0074338 A1* | 3/2010 | Yamori | H04N 19/136 |
| | | | 375/E7.104 |
| 2014/0079135 A1 | 3/2014 | Van Der Auwera et al. | |
| 2014/0286402 A1* | 9/2014 | Nishitani | H04N 19/124 |
| | | | 375/240.03 |
| 2014/0286403 A1* | 9/2014 | Nishitani | H04N 19/124 |
| | | | 375/240.03 |
| 2015/0071345 A1* | 3/2015 | Tourapis | H04N 19/86 |
| | | | 375/240.03 |
| 2016/0050417 A1* | 2/2016 | Lee | H04N 19/124 |
| | | | 375/240.03 |
| 2016/0150230 A1* | 5/2016 | He | H04N 19/124 |
| | | | 375/240.03 |
| 2018/0020241 A1* | 1/2018 | Li | H04N 19/13 |
| 2019/0230356 A1 | 7/2019 | Chao et al. | |
| 2019/0273923 A1 | 9/2019 | Huang et al. | |
| 2021/0058620 A1* | 2/2021 | Ramasubramonian | |
| | | | H04N 19/44 |
| 2021/0120245 A1 | 4/2021 | Kawaguchi et al. | |
| 2021/0195226 A1* | 6/2021 | Zhao | H04N 19/13 |
| 2021/0227221 A1* | 7/2021 | Lim | H04N 19/70 |
| 2022/0007023 A1 | 1/2022 | Sim et al. | |
| 2022/0279186 A1* | 9/2022 | Paluri | H04N 19/119 |
| 2022/0279210 A1* | 9/2022 | Pu | H04N 19/70 |
| 2022/0303542 A1* | 9/2022 | Paluri | H04N 19/186 |
| 2022/0329839 A1 | 10/2022 | Zhao et al. | |
| 2022/0337848 A1* | 10/2022 | Francois | H04N 19/70 |
| 2024/0073431 A1* | 2/2024 | Rosewarne | H04N 19/46 |
| 2024/0073432 A1* | 2/2024 | Rosewarne | H04N 19/18 |

FOREIGN PATENT DOCUMENTS

| | | |
|---|---|---|
| CN | 110418133 A | 11/2019 |
| CN | 110881129 | 3/2020 |
| CN | 111602395 | 8/2020 |
| CN | 111602395 A | 8/2020 |
| CN | 112997486 | 6/2021 |
| CN | 112997486 A | 6/2021 |
| GB | 201021924 | 2/2011 |
| JP | 2020-005110 A | 1/2020 |
| JP | 2021-048458 A | 3/2021 |
| WO | WO 2008126135 A1 | 10/2008 |
| WO | WO 2013032576 A2 | 3/2013 |
| WO | WO 2016074147 A1 | 5/2016 |
| WO | WO 2020048361 A1 | 3/2020 |
| WO | WO 2020056017 | 3/2020 |
| WO | WO 2020056017 A9 | 5/2020 |
| WO | WO 2020231228 | 11/2020 |

OTHER PUBLICATIONS

International Search Report in International Appln. No. PCT/CN2022/131068, mailed on Jan. 13, 2023, 4 pages.

Budagavi et al., "HEVC Transform and Quantization," High Efficiency Video Coding (HEVC): Algorithms and Architectures, Integrated Circuits and Systems, Springer, Jun. 26, 2014, Chapter 6, pp. 141-169.

Extended European Search Report in European Appln. No. 22892039.3, mailed on Feb. 7, 2025, 14 pages.

Li et al., "Adaptive De-Quantization Offset," Paper, Presented at the 5th Meeting: Joint Collaborative Team on Video Coding (JCT-VC) of ITU-T SG16 WP3 and ISO/IEC JTC1/SC29/WG11, Geneva, CH, Mar. 16-23, 2011; JCT-VC, JCTVC-E091, Mar. 16-23, 2011, 6 pages.

Office Action in Japanese Appln. No. 2024-527665, mailed on May 20, 2025, 6 pages (with English translation).

Office Action in Japanese Appln. No. 2024-527665, mailed on Nov. 25, 2025, 6 pages (with English translation).

* cited by examiner

DECODING METHOD, ENCODING METHOD AND APPARATUS

CROSS-REFERENCE TO RELATED APPLICATIONS

This application is a national stage of International Application No. PCT/CN2022/131068, filed on Nov. 10, 2022, which claims priority to Chinese Patent Application No. 202111334223.8, filed on Nov. 11, 2021. The disclosures of both of the aforementioned applications are hereby incorporated by reference in their entireties.

TECHNICAL FIELD

The present disclosure relates to the field of video encoding and decoding, in particular to a decoding method and apparatus, and an encoding method and apparatus for a picture.

BACKGROUND

In a video encoding and decoding technology, a video compression technology is particularly important. In the video compression technology, space (intra-picture) prediction and/or time (inter-picture) prediction are performed to reduce or remove redundant information inherent in video sequences. The basic principle of video compression is to quantize a correlation between a space domain, a time domain, and a codeword to remove as much redundancy as possible. Quantization is a process of mapping continuous values (or a large number of discrete values) of a signal into a finite number of discrete amplitudes to achieve a many-to-one mapping of signal values.

SUMMARY

The present disclosure provides a decoding method and apparatus, and an encoding method and apparatus for a picture, which solve the problem of large quantization distortion in the picture encoding and decoding process.

The present disclosure is realized by the following technical solution.

According to a first aspect, the present disclosure provides a decoding method for a picture. The method may be applied to a video coding system, or the method may be applied to a decoding side which supports video decoding to realize the method, for example, the decoding side includes a video decoder. The method includes: analyzing a code stream to obtain one or more picture frames, where a picture frame includes one or more coding units (CUs); determining a plurality of quantization parameter (QP) values for the picture frame, where a CU includes a plurality of quantization groups (QGs), and a QG corresponds to a QP value; and decoding, based on the plurality of QP values, the picture frame.

In an embodiment, the CU includes a plurality of residual coefficients, the QG includes a portion of the plurality of residual coefficients, and the portion of the plurality of residual coefficients share a same QP value.

In an embodiment, before determining the plurality of QP values for the picture frame, the method further includes: dividing a CU included in the picture frame according to a first rule to obtain the plurality of QGs; where the first rule include a division domain and a division mode, the division domain is a pixel domain, and the division mode includes uniform division.

In an embodiment, the CU includes a plurality of residual coefficients, the plurality of residual coefficients have positions marked by coordinates, and each of the coordinates includes a horizontal coordinate and a vertical coordinate. If the division domain is a transform domain, dividing the CU included in the picture frame according to the first rule to obtain the plurality of QGs includes: dividing a residual coefficient in the plurality of residual coefficients whose coordinate sum does not reach a first coordinate threshold into a first QG, and dividing a residual coefficient in the plurality of residual coefficients whose the coordinate sum reaches the first coordinate threshold into a second QG, where a coordinate sum of is a sum of a horizontal coordinate and a vertical coordinate of a residual coefficient.

Alternatively, a residual coefficient in the plurality of residual coefficients whose coordinate sum does not reach the first coordinate threshold is divided into the first QG, a residual coefficient in the plurality of residual coefficients whose coordinate sum reaches the first coordinate threshold and does not reach a second coordinate threshold is divided into the second QG, and a residual coefficient in the plurality of residual coefficients whose coordinate sum reaches the second coordinate threshold is divided into a third QG. The second coordinate threshold is greater than the first coordinate threshold.

In an embodiment, the CU includes the plurality of residual coefficients, and if the division domain is a transform domain, dividing the CU included in the picture frame according to the first rule to obtain the plurality of QGs includes:

ordering the plurality of residual coefficients, dividing residual coefficients in the plurality of residual coefficients that do not reach a first proportion threshold into a first QG, and dividing residual coefficients in the plurality of residual coefficients that reach the first proportion threshold into a second QG, where the plurality of residual coefficients are ordered in any one of the following ways: zig-zag, and reverse zig-zag.

Alternatively, the plurality of residual coefficients are ordered, a residual coefficient in the plurality of residual coefficients that does not reach the first proportion threshold is divided into the first QG, a residual coefficient in the plurality of residual coefficients that reaches the first proportion threshold and does not reach a second proportion threshold is divided into the second QG, and a residual coefficient in the plurality of residual coefficients that reaches the second proportion threshold is divided into a third QG. The second proportion threshold is greater than the first proportion threshold.

In an embodiment, the CU includes the plurality of residual coefficients, and if the division domain is a pixel domain, dividing the CU included in the picture frame according to the first rule to obtain the plurality of QGs includes: symmetrically dividing the plurality of residual coefficients in the horizontal or vertical direction to obtain two QGs including a same number of residual coefficients.

Alternatively, the plurality of residual coefficients are symmetrically divided in a horizontal or vertical direction to obtain three QGs. two of the three QGs that are not adjacent to each other contain the same number of residual coefficients and the other QG contains a number of residual coefficients that is consistent with the sum of the number of residual coefficients contained in the two QGs that are not adjacent to each other.

Alternatively, the plurality of residual coefficients are divided in a horizontal or vertical direction to obtain two QGs that contain an inconsistent number of residual coefficients.

Alternatively, the plurality of residual coefficients are divided in a horizontal or vertical direction to obtain three QGs. The three QGs contain residual coefficients that do not have a symmetrical relationship.

In an embodiment, the QP value corresponding to the QG includes a luminance QP value and a chrominance QP value. determining the plurality of QP values for the picture frame includes: obtaining the luminance QP value and the chrominance QP value of the QG, respectively; or
obtaining the luminance QP value of the QG; and determining, based on the luminance QP value, the chrominance QP value of the QG.

In an embodiment, determining the plurality of QP values for the picture frame includes: analyzing the code stream to obtain label information for the picture frame, where the label information is configured to indicate a QP value for the QG, and/or, the label information is configured to indicate a QP value for the CU.

In an embodiment, determining the plurality of QP values for the picture frame includes: analyzing the code stream to obtain label information for the picture frame, where the label information is configured to indicate a QP offset for the QG; and determining a QP value for the QG based on a predicted QP value for the QG and the label information.

In an embodiment, determining the QP value for the QG based on the predicted QP value for the QG and the label information includes: obtaining the predicted QP value for the QG, and determining the sum of the predicted QP value for the QG and the QP offset of the QG as the QP value for the QG.

In an embodiment, determining the plurality of QP values for the picture frame includes: obtaining a predicted QP value for the QG; and determining, based on the predicted QP value for the QG and derivation information, the QP value for the QG, where the derivation information is one or more of flatness information or texture information of the QG, remaining space of a code stream buffer, or distortion constraint information.

In an embodiment, if the derivation information is the distortion constraint information, the distortion constraint information indicates a distortion threshold for any one of the plurality of QGs. Determining, based on the predicted QP value for the QG and the derivation information, the QP value for the QG includes: determining a predicted distortion corresponding to the predicted QP value; and when the predicted distortion is less than or equal to the distortion threshold, determining the predicted QP value as the QP value for the QG, and when the predicted distortion is greater than the distortion threshold, determining the QP value determined by the distortion threshold as the QP value for the QG.

In an embodiment, if the derivation information is the flatness information or the texture information of the QG, or the remaining space of the code stream buffer, determining, based on the predicted QP value for the QG and the derivation information, the QP value for the QG includes: determining, based on the derivation information, a QP offset of the QG; and determining a sum of the predicted QP value for the QG and the QP offset of the QG as the QP value for the QG.

In an embodiment, obtaining a QP value for at least one other QG of the CU that is adjacent to the QG; and determining, based on the QP value for the at least one other QG, the predicted QP value for the QG.

Alternatively, a QP value for the CU is determined as the predicted QP value for the QG.

In an embodiment, the picture frame includes at least a first part of CUs and a second part of CUs, the first part of CUs and the second part of CUs do not have overlapping regions, and the QP values for the first part of CUs and the QP values for the second part of CUs are obtained in different ways.

In an embodiment, determining the plurality of QP values for the picture frame includes: analyzing the code stream to obtain label information for the picture frame, where the label information includes the QP offsets of the first part of CUs; and determining QP values for the first part of CUs based on the label information. Also, with respect to the second part of CUs, predicted QP values for the second part of CUs are obtained, and QP values for the second part of CUs are determined based on the predicted QP values for the second part of CUs and derivation information. The derivation information is one or more of: flatness information or texture information of the second portion CU, remaining space of a code stream buffer, or distortion constraint information.

In an embodiment, decoding, based on the plurality of QP values, the picture frame includes: obtaining, for each of the plurality of QP values, a quantization step (Qstep) corresponding to the QP value; obtaining a level value contained in a QG corresponding to the QP value; and performing a dequantization on the level value of the QG based on a combination of quantizers selected, where the combination of quantizers includes one or more quantizers.

For example, each of the one or more quantizers is a uniform quantizer or a non-uniform quantizer.

In an embodiment, the combination of quantizers is determined by the label information carried by the code stream, or by the distribution of residual coefficients in the QG.

In an embodiment, performing the dequantization on the level value of the QG includes: determining a type of division domain for the QG; when the type of division domain for the QG is a transform domain, selecting a quantization matrix matching parameter information of the QG from a library of matrix templates at the decoding side, where the library of matrix templates includes a plurality of types of quantization matrix templates, and the parameter information includes one or more of a dimension of the QG, a dimension of a CU in which the QG is, luminance and chrominance channel information, or flatness information; and performing a dequantization on the level value in the QG with the quantization matrix of the QG to obtain residual coefficients of the QG.

In an embodiment, the plurality of types of quantization matrix templates include a flat block template and a texture block template; the Qstep of the residual coefficients of the flat block template with frequencies above a frequency threshold is greater than or equal to the Qstep of the residual coefficients of the flat block template with frequencies that do not reach the frequency threshold; and the Qstep of the residual coefficients of the texture block template with frequencies above the frequency threshold is less than or equal to the Qstep of residual coefficients of the textured block template with frequencies that does not reach the frequency threshold.

In an embodiment, the quantization matrix templates included in the library of matrix templates are obtained by one or more types of the following transformation ways:

discrete cosine transform (DCT), discrete sine transform (DST), integer transform, or discrete wave transform (DWT).

In an embodiment, the QG includes one or more pixels of the picture frame.

In an embodiment, determining the plurality of QP values for the picture frame includes: analyzing the code stream to determine one or more QGs in the CU that are labelled, where a dequantization is performed on the labelled one or more QGs during decoding, and the dequantization is not performed the un-labeled QGs in the CU; and with respect to each of the labelled one or more QGs, obtaining a QP value for the QG.

Alternatively, a scanning order of all QGs included in the CU is determined, where the scanning order includes one or more of: top-to-bottom, left-to-right, zig-zag, or reverse-zig-zag order; and for each of the QGs, a QP value for each of the QGs is obtained in the scanning order.

In an embodiment, at least two of the plurality of QGs correspond to different QP values.

According to a second aspect, the present disclosure provides a decoding method for a picture. The method may be applied to a video coding system, or the method may be applied to a decoding side which supports video decoding to realize the method. The method includes: analyzing a code stream to obtain one or more picture frames, where a picture frame includes one or more coding units (CUs); determining a plurality of quantization parameter (QP) values for the picture frame, where a CU includes a plurality of pixels, a pixel corresponds to a QP value, at least two of the plurality of pixels have different QP values, and the QP value corresponding to the pixel is adaptively adjusted based on information of reconstructed pixels surrounding a current pixel; and decoding, based on the plurality of QP values, the picture frame.

In an embodiment, determining the plurality of QP values for the picture frame includes: obtaining a predicted QP value for the pixel; and determining, based on the predicted QP value for the pixel and derivation information, the QP value for the pixel, where the derivation information is information of one or more reconstructed pixels surrounding the pixel.

In an embodiment, the predicted QP value for the pixel is the QP value for the CU or QG in which the pixel point is, or is derived from the QP value for the one or more reconstructed pixels surrounding the pixel, where a method for derivation includes calculating at least one of a mean, median, or mode.

In an embodiment, the QG is a sub-block of a coding block (CB).

In an embodiment, the one or more reconstructed pixels are in a square region centered on the pixel, or in a rhombus region centered on the pixel.

In an embodiment, the information of the one or more reconstructed pixels includes one or more of: a pixel value, flatness information or texture information, background luminance, or contrast.

In an embodiment, determining, based on the predicted QP value for the pixel and the derivation information, the QP value for the pixel includes: determining, based on the information of the one or more reconstructed pixels surrounding the pixel, indication information for the pixel; and adjusting, based on the indication information and a QP value corresponding to just noticeable distortion, the predicted QP value to determine an adjusted QP value as the QP value for the pixel. The QP value corresponding to the just noticeable distortion is a preset value (for example, picture-level or CU-level information preset by the encoding or decoding side), or is obtained by analyzing a code stream (picture level or CU level transmission), or is derived from flatness information or texture information, background luminance, and contrast information of a surrounding reconstructed CU.

According to a third aspect, the present disclosure provides an encoding method for a picture, the method may be applied to a video coding system, or the method may be applied to an encoding side which supports video encoding to realize the method. The method may be performed by the encoding side. The method includes: dividing a picture frame into one or more coding units (CUs); determining a plurality of quantization parameter (QP) values for the picture frame, where a CU includes a plurality of quantization groups (QGs), and a QG corresponds to a QP value; and encoding, based on the plurality of QP values, the picture frame.

According to a fourth aspect, the present disclosure provides an encoding method for a picture, the method may be applied to a video coding system, or the method may be applied to an encoding side which supports video encoding to realize the method. The method may be performed by the encoding side. The method includes: dividing a picture frame into one or more coding units (CUs); determining a plurality of quantization parameter (QP) values for the picture frame, where a CU includes a plurality of pixels, a pixel corresponds to a QP value, at least two of the plurality of pixels have different QP values, and the QP value corresponding to the pixel is adaptively adjusted based on information of reconstructed pixels surrounding a current pixel; and encoding, based on the plurality of QP values, the picture frame.

According to a fifth aspect, the present disclosure provides a decoding apparatus for a picture. The decoding apparatus may be applied to a decoding side. The decoding apparatus includes various modules for implementing the method in any one of the embodiments of the first aspect or the second aspect. For example, the apparatus includes a code stream analyzing unit, a QP decision unit and a picture decoding unit.

The beneficial effects may be described in either of the first aspect or the second aspect and will not be repeated herein, the decoding apparatus has functions to implement the behavior in the method of the first aspect or the second aspect. The functions may be realized by hardware or by hardware executing corresponding software. the hardware or software includes one or more modules corresponding to the functions.

According to a sixth aspect, the present disclosure provides an encoding apparatus for a picture. The encoding apparatus may be applied to an encoding side. The encoding apparatus includes various modules for implementing the method in any one of the embodiments of the third aspect or the fourth aspect. For example, the encoding apparatus includes: a picture dividing unit, a QP decision unit and a picture encoding unit. The beneficial effects may be described in either of the third aspect or the fourth aspect and will not be repeated herein. The encoding apparatus has functions to implement the behavior in the method of the third aspect or the fourth aspect. The functions may be realized by hardware or by hardware executing corresponding software. the hardware or software includes one or more modules corresponding to the functions.

According to a seventh aspect, the present disclosure provides an electronic device including a processor and a memory for storing computer instructions, where the computer instructions, when executed by the processor, cause the processor to perform the method of any one of the first aspect to the fourth aspect.

For example, the electronic device may refer to a video encoder, or an encoding side including a video encoder.

For another example, the electronic device may refer to a video decoder, or a decoding side including a video decoder.

According to an eighth aspect, the present disclosure provides a computer-readable storage storing computer programs or instructions, where the computer programs or instructions, when executed by an electronic device, cause the electronic device to perform the method of any one of the first aspect to the fourth aspect.

According to a ninth aspect, the present disclosure provides a computer program product including instructions, where the computer program product when run on a computing device or processor, cause the computing device or processor to execute the instructions to perform the method of any one of the embodiments of the first aspect to the fourth aspect.

According to a tenth aspect, the present disclosure provides a video coding system, including: an encoding side and a decoding side, where the encoding side is communicatively connected to the decoding side, the decoding side is configured to perform the method of any one of the first aspect and the second aspect, and the encoding side is configured to perform the method of any one of the third aspect and the fourth aspect.

The present disclosure may be further combined to provide additional implementations based on the implementations provided in the above-mentioned aspects.

DETAILED DESCRIPTION OF THE EMBODIMENTS

In order to describe the following embodiments clearly and concisely, firstly, the related arts are briefly introduced.

Figure 1:
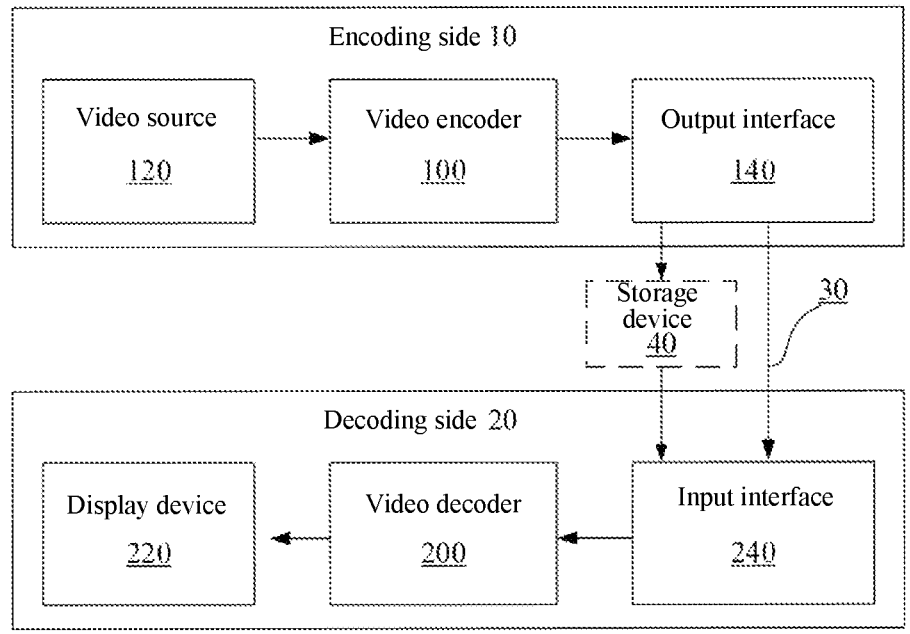
FIG. 1 is a block diagram illustrating a video coding system according to an embodiment of the present disclosure.

FIG. 1 is a block diagram illustrating a video coding system according to an embodiment of the present disclosure. As used herein, the term "video coder" generally refers to both the video encoder and the video decoder. As used herein, the term "video coding" or "coding" may refer generally to either video encoding or video decoding. The video encoder 100 and the video decoder 200 of the video coding system 1 are used to predict motion information, such as a motion vector, of the currently coded picture block or its sub-blocks according to examples of various method described in any one of new inter prediction modes proposed in the present disclosure, so that the predicted motion vector is as close as possible to the motion vector obtained by using the motion estimation method, therefore there is no need to transmit the motion vector difference value during encoding, thereby the encoding and decoding performance is further improved.

As shown in FIG. 1, the video coding system 1 includes an encoding side 10 and a decoding side 20. The encoding side 10 generates encoded video data. Thus, the encoding side 10 may be referred to as a video encoding apparatus. The decoding side 20 may decode the encoded video data generated by the encoding side 10. Thus, the decoding side 20 may be referred to as a video decoding apparatus. Various embodiments of the encoding side 10, the decoding side 20 or both may include one or more processors and a memory coupled to the one or more processors. the memory may include, but is not limited to, a random access memory (RAM), a read-only memory (ROM), an electrically erasable programmable read only memory (EEPROM), flash memory, or any other media that may be used to store the desired program codes in the form of computer-accessible instructions or data structures, as described herein.

The encoding side 10 and the decoding side 20 may include a variety of devices, including a desktop computer, a mobile computing device, a notebook (e.g., laptop) computer, a tablet computer, a set-top box, a portable telephone such as a "smart" phone, a television, a camera, a display device, a digital media player, a video game console, an on-board computer, or the like.

The decoding side 20 may receive the encoded video data from the encoding side 10 via a link 30. The link 30 may include one or more media or devices capable of moving the encoded video data from the encoding side 10 to the decoding side 20. In an example, the link 30 may include one or more communication media that enable the encoding side 10 to transmit the encoded video data directly to the decoding side 20 in real time. In this example, the encoding side 10 may modulate the encoded video data according to a communication standard, such as a wireless communication protocol, and may transmit the modulated video data to the decoding side 20. The one or more communication media may include wireless and/or wired communication media, such as radio frequency (RF) spectrum or one or more physical transmission lines. The one or more communication media may form a part of a packet-based network, and the packet-based network may be, for example, a local area network (LAN), a wide area network (WAN), or a global network (e.g., an Internet). The one or more communication media may include a router, switch, base station, or other device that facilitates communication from the encoding side 10 to the decoding side 20.

In another example, the encoded data may be output from an output interface 140 to a storage device 40. Similarly, the encoded data may be accessed from the storage device 40 via an input interface 240. The storage device 40 may include any one of a variety of distributed or locally accessible data storage media, such as a hard disk drive, a Blu-ray disc, a digital video disc (DVD), a compact disc read-only memory (CD-ROM), a flash memory, a volatile or non-volatile memory, or any other suitable digital storage media for storing the encoded video data.

In another example, the storage device 40 may correspond to a file server or another intermediate storage device that may hold the encoded video generated by the encoding side 10. The decoder 20 can access the stored video data from the storage device 40 via streaming or downloading transmission. The file server may be any type of server capable of storing encoded video data and transmitting the encoded video data to the decoding side 20. In an example, a file server includes a network server (for example, for websites), a file transfer protocol (FTP) server, a network attached storage (NAS) device, or a local disk drive. The decoding side 20 can access the encoded video data through any standard data connection (including an Internet connection). This may include a wireless channel (e.g., a wireless-fidelity (WiFi) connection), a wired connection (e.g., a digital subscriber line (DSL), a cable modem, etc.), or a combination of both suitable for accessing encoded video data stored on a file server. The transmission of encoded video data from the storage device 40 may be streaming transmission, downloading transmission or a combination of both.

The decoding method for a picture provided in the present disclosure may be applied to video coding and decoding to support a variety of multimedia applications, such as over-the-air television broadcasting, cable television transmission, satellite television transmission, streaming video transmission (e.g., via an Internet), encoding of video data for storage on a data storage medium, decoding of video data for storage on a data storage medium, or other applications. In some examples, the video coding system 1 may be used to support unidirectional or bidirectional video transmission to support, for example, applications such as video streaming, video playback, video broadcasting, and/or video telephony.

The video coding system 1 illustrated in FIG. 1 is an example only, and the techniques of the present disclosure may be applicable to video decoding setups (e.g., video encoding or video decoding) that do not necessarily include any data communication between an encoding apparatus and a decoding apparatus. In other examples, data is retrieved from local memory, streamed over a network, and so on. A video encoding apparatus may encode the data and store the data to a memory, and/or a video decoding apparatus may retrieve the data from the memory and decode the data. In many examples, the encoding and decoding are performed by devices that do not communicate with each other but only encode the data to the memory and/or retrieve the data from the memory and decode the data.

In the example of FIG. 1, the encoding side 10 includes a video source 120, a video encoder 100 and an output interface 140. In some examples, the output interface 140 may include a modulator/demodulator (modem) and/or a transmitter. The video source 120 may include a video capture device (e.g., a video camera), a video archive containing previously captured video data, a video feed interface for receiving video data from a video content provider, and/or a computer graphics system for generating video data, or a combination of these sources of video data.

The video encoder 100 may encode the video data from the video source 120. In some examples, the encoding side 10 transmits the encoded video data directly to the decoding side 20 via the output interface 140. In other examples, the encoded video data can also be stored on the storage device 40 for later access by the decoding side 20 for decoding and/or playing.

In the example of FIG. 1, the decoding side 20 includes an input interface 240, a video decoder 200 and a display device 220. In some examples, the input interface 240 includes a receiver and/or a modem. The input interface 240 may receive the encoded video data via the link 30 and/or from the storage device 40. The display device 220 may be integrated with the decoding side 20 or may be external to the decoding side 20. Generally, the display device 220 displays the decoded video data. The display device 220 may include various display devices, for example, a liquid crystal display (LCD), a plasma display, an organic light-emitting diode (OLED) display or other types of display devices.

Although not shown in FIG. 1, in some aspects, the video encoder 100 and the video decoder 200 may be integrated with the audio encoder and decoder, respectively, and may include an appropriate multiplexer-demultiplexer (MUX-DEMUX) unit or other hardware and software to handle encoding of both audio and video in a common data stream or separate data streams. In some instances, if applicable, the MUX-DEMUX unit may conform to the ITU H.223 multiplexer protocol, or other protocols such as the user datagram protocol (UDP).

The video encoder 100 and the video decoder 200 may each be implemented as any of various circuits such as one or more microprocessors, a digital signal processor (DSP), an application specific integrated circuit (ASIC), a field programmable gate array (FPGA), discrete logic, hardware or any combination thereof. If the present disclosure is implemented in part in software, the device may store instructions for software in a suitable non-volatile computer-readable storage media, and may implement the technology of the present disclosure by executing the instructions in hardware through one or more processors. Any of the foregoing (including hardware, software, combinations of hardware and software, etc.) may be considered one or more processors. Each of the video encoder 100 and the video decoder 200 may be contained in one or more encoders or decoders, and any one of the encoders or decoders may be integrated as a part of a combined encoder/decoder (coder) in the corresponding device.

The present disclosure may broadly refer to the video encoder 100 as another device that "signals" or "transmits" certain information to, for example, the video decoder 200. The term "signaling" or "transmitting" may generally refer to the transmission of syntax elements and/or other data used to decode compressed video data. This transmission may occur in real time or almost real time. Alternatively, the communication may occur over a period of time, for example at the time of encoding when the syntax elements are stored in the encoded stream on the computer-readable storage medium, and the decoding apparatus may then retrieve the syntax elements at any time after the syntax elements have been stored on this storage medium.

The joint collaborative team on video coding (JCT-VC) developed the H.265 (high efficiency video coding, HEVC) standard. The HEVC standardization is based on an evolutionary model of a video decoding apparatus called a HEVC model (HM). The latest standard document for H.265 can be found from http://www.itu.int/rec/T-REC-H.265. The latest version of the standard document is H.265 (12/16), which is incorporated herein by reference. The HM assumes that the video decoding device has several additional capabilities relative to the existing algorithms of ITU-TH.264/AVC. For example, the H.264 provides 9 intra-frame predictive encoding modes, while HM may provide up to 35 intra-frame predictive encoding modes.

The joint video exploration team (JVET) is committed to developing the H.266 standard. The process of H.266 standardization is based on an evolutionary model of a video decoding apparatus called the H.266 test model. The algorithm description for H.266 can be found from http://phenix.int-evry.fr/jvet, the latest algorithm description is included in JVET-F1001-v2, and the algorithm description document is incorporated herein by reference. The reference software for JEM testing models can be found from https://jvet.hhi.fraunhofer.de/svn/svn_HMJEMSoftware/, which is incorporated herein by reference.

In general, the working model description of HM can divide a video frame or picture into a sequence of tree blocks containing both luminance and chrominance samples or largest coding unit (LCU), which is also known as coding tree unit (CTU). A tree block has a similar purpose as a macroblock in the H.264 standard. The slice contains several consecutive tree blocks in decoding order. A video frame or picture may be segmented into one or more slices. Each tree block can be split into coding units (CUs) based on a quadtree. For example, a block that is the root node of a quadtree can be split into four child nodes, and each child node can be a parent node and be split into four additional child nodes. The final inseparable child nodes as leaf nodes of quadtree include decoding nodes, for example, decoded video blocks. The syntax data associated with the decoded stream can define the maximum number of tree block splits and the minimum size of decoding nodes.

The size of CU corresponds to the size of the decoding node and the shape must be square. The size of CU can range from 8×8 pixels up to the size of a tree block of 64×64 pixels or more.

A video sequence usually contains a series of video frames or pictures. A group of pictures (GOP) illustratively includes a series, one or more video pictures. A GOP may contain syntax data in header information of a GOP, header information of one or more pictures, or elsewhere, which describes the number of pictures contained in a GOP. Each slice of a picture may contain slice syntax data describing the encoding mode of the corresponding picture. The video encoder 100 typically operates on video blocks within individual video slices in order to encode video data. A video block may correspond to a decoding node within a CU. A video block may have a fixed or variable size and may be different in size according to a specified decoding standard.

In the present disclosure, "N×N" and "N by N" may be used interchangeably to refer to the pixel size of the video block in accordance with the vertical dimension and the horizontal dimension, for example, 16×16 pixels or 16 by 16 pixels. Generally, a 16×16 block will have 16 pixels in the vertical direction (y=16) and 16 pixels in the horizontal direction (x=16). Similarly, an N×N block will have N pixels in the vertical direction and N pixels in the horizontal direction, where N denotes a non-negative integer value. The pixels in the block may be arranged in rows and columns. In addition, the block does not necessarily need to have the same number of pixels in the horizontal direction as in the vertical direction. For example, the block may include N×M pixels, where M is not necessarily equal to N.

After intra/inter-frame predictive decoding for the CU, the video encoder 100 may calculate residual data for the CU. The CU may include pixel data in a space domain (also referred to as a pixel domain), and the CU may include coefficients in the transform domain after applying a transform (e.g., a discrete cosine transform (DCT), an integer transform, a discrete wavelet transform, or a conceptually similar transform) to the residual video data. The residual data may correspond to the pixel difference between the pixels of the uncoded picture and the predicted values corresponding to the CU. The video encoder 100 may form a CU containing the residual data and generate a transform coefficient for the CU.

After any transformation to produce the transform coefficients, the video encoder 100 may perform quantization on the transform coefficients. The quantization exemplarily refers to the process of quantizing the coefficients to reduce the amount of data used to represent the coefficients, thereby the process of compression is further provided. The process of quantization may reduce the bit depth associated with some or all of the coefficients. For example, n-bit values may be rounded down to m-bit values during quantization, where n is greater than m.

In some embodiments, the video encoder 100 may scan, by using a predefined scan order, the quantized transform coefficients to produce serialized vectors that may be entropy encoded. In other embodiments, the video encoder 100 may perform adaptive scanning. After scanning the quantized transform coefficients to form one-dimensional vectors, the video encoder 100 may perform entropy decoding on the one-dimensional vectors based on context-based adaptive variable-length code (CAVLC), context-based adaptive binary arithmetic coding (CABAC), syntax-based adaptive binary arithmetic coding (SBAC), probability interval partitioning entropy (PIPE) encoding or other entropy encoding methods. The video encoder 100 may also perform entropy encoding on syntax elements associated with the encoded video data, so as to decode the video data by video decoder 200.

To perform the CABAC, the video encoder 100 may assign context within the context model to the symbols to be transmitted. The context can be related to whether the adjacent values of symbols are non-zero. To perform the CAVLC, the video encoder 100 may select a variable length code for the symbols to be transmitted. The codewords in the variable-length code (VLC) may be constructed, such that relatively short codes correspond to symbols that are more likely and longer codes correspond to symbols that are less likely. In this manner, the use of VLC can result in code rate savings relative to the use of equal-length codewords for each symbol to be transmitted. The probability in the CABAC can be determined based on the context assigned to the symbols.

In the embodiments of the present disclosure, the video encoder may perform inter-frame prediction to reduce temporal redundancy between pictures. In the embodiments of the present disclosure, the CU currently decoded by the video decoder may be referred to as a current CU. In the embodiments of the present disclosure, the picture currently decoded by the video decoder may be referred to as a current picture.

Figure 2:
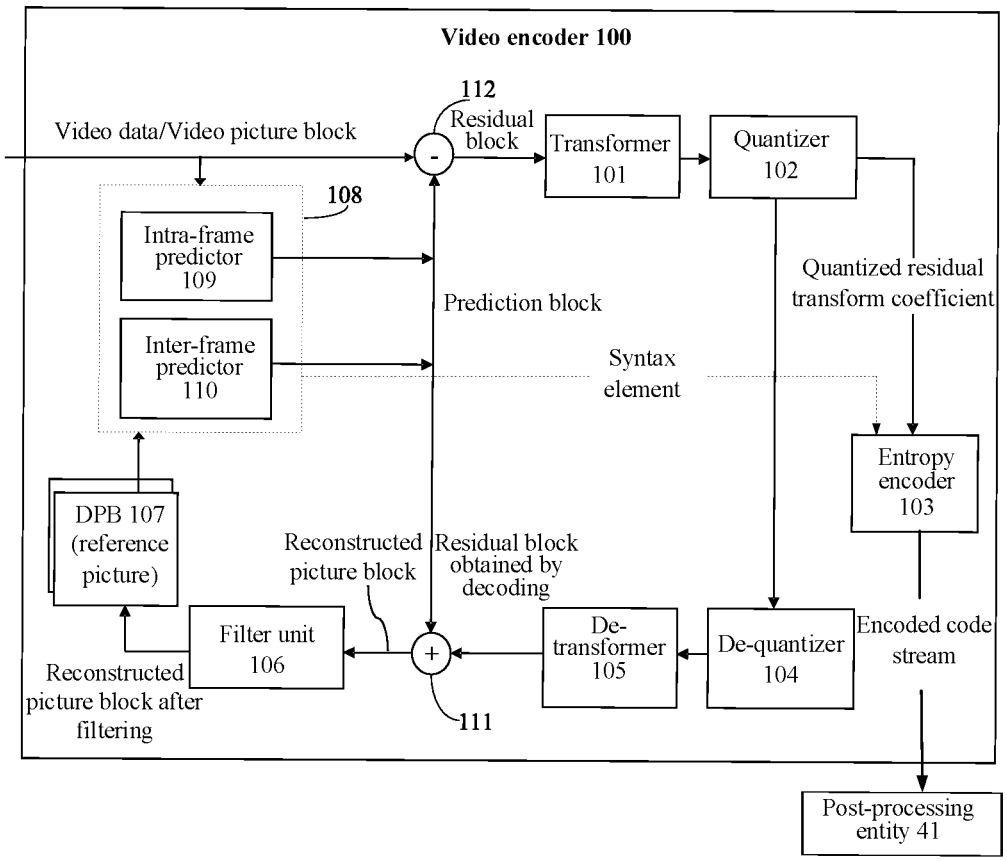
FIG. 2 is a block diagram illustrating a video encoder according to an embodiment of the present disclosure.

FIG. 2 is a block diagram illustrating a video encoder according to an embodiment of the present disclosure. The video encoder 100 is configured to output a video to a post-processing entity 41. The post-processing entity 41 represents an example of a video entity that may process the encoded video data from the video encoder 100, such as a media-aware network element (MANE) or a stitching/editing device. In some instances, the post-processing entity 41 may be an instance of a network entity. In some video encoding systems, the post-processing entity 41 and the video encoder 100 may be several portions of separate devices, while in other cases, the functionality described with respect to the post-processing entity 41 may be performed by the same device that includes the video encoder 100. In an example, the post-processing entity 41 is an example of the storage device 40 of FIG. 1.

In the example of FIG. 2, the video encoder 100 includes a prediction processing unit 108, a filter unit 106, a decoded picture buffer (DPB) 107, a summator 112, a transformer 101, a quantizer 102, and an entropy encoder 103. The prediction processing unit 108 includes an inter-frame predictor 110 and an intra-frame predictor 109. For picture block reconstruction, the video encoder 100 also includes a de-quantizer 104, a de-transformer 105 and a summator 111. The filter unit 106 is intended to represent one or more loop filters, such as a de-blocking filter, an adaptive loop filter (ALF) and a sample adaptive offset (SAO) filter. Although the filter unit 106 is shown as an in-loop filter in FIG. 2, in other implementations, the filter unit 106 may be implemented as an after-loop filter. In an example, the video encoder 100 may also include a video data memory, a segmentation unit (not shown in the figures).

The video data memory may store video data to be encoded by components of the video encoder 100. The video data stored in the video data memory may be obtained from the video source 120. The DPB 107 may be a reference picture memory, which stores reference video data for encoding video data by the video encoder 100 in an intra-frame and inter-frame coding mode. The video data memory and the DPB 107 may be formed by any of a variety of memory devices, such as synchronous dynamic random access memory (SDRAM), a dynamic random access memory (DRAM), a magnetic random access memory (MRAM), a resistive random access memory (RRAM), or other types of memory devices. The video data memory and the DPB 107 may be provided by the same memory device or separate memory devices.

As shown in FIG. 2, the video encoder 100 receives video data and stores the video data in the video data memory. The segmentation unit splits the video data into a number of picture blocks, and these picture blocks may be further split into smaller blocks, such as picture block splitting based on a quadtree structure or a binary tree structure. This segmentation may also include segmentation into slices, tiles or other larger units. The video encoder 100 generally illustrates components that encode picture blocks within a video slice to be encoded. The slice may be divided into a plurality of picture blocks (and may be divided into collections of picture blocks called slices). The prediction processing unit 108 may select one of a plurality of possible coding modes to be used for the current picture block, such as one of a plurality of intra-frame coding modes or one of a plurality of inter-frame coding modes. The prediction processing unit 108 may provide the intra-frame coding block and inter-frame coding block to the summator 112 to generate a residual block and to the summator 111 to reconstruct the encoded block for use as a reference picture.

The intra-frame predictor 109 in the prediction processing unit 108 may perform intra-frame predictive encoding of the current picture block with respect to one or more neighboring blocks in the same frame or slice as the current block to be encoded to remove spatial redundancy. The inter-frame predictor 110 in the prediction processing unit 108 may perform inter-frame predictive encoding of the current picture block with respect to one or more predicted blocks in one or more reference pictures to remove temporal redundancy.

Specifically, the inter-frame predictor 110 may be configured to determine an inter-frame prediction mode for encoding the current picture block. For example, the inter-frame predictor 110 may use code rate-distortion analysis to calculate the rate-distortion values of various inter-frame prediction modes in the set of candidate inter-frame prediction modes, and select an inter-frame prediction mode with the best code rate-distortion characteristic. The code rate-distortion analysis typically determines the amount of distortion (or error) between the encoded block and the original un-encoded block that was encoded to produce the encoded block, and produce the bit-code rate (i.e., the number of bits) used to produce the encoded block. For example, the inter-frame predictor 110 may determine that the inter-frame prediction mode in the set of candidate inter-frame prediction modes that encodes the current picture block with the least costly code rate distortion is the inter-frame prediction mode used to perform the inter-frame prediction of the current picture block.

The inter-frame predictor 110 is used to predict motion information (e.g., motion vectors) of one or more sub-blocks in the current picture block based on the determined inter-frame prediction mode, and obtain or generate a prediction block of the current picture block by using the motion information (e.g., motion vectors) of one or more sub-blocks in the current picture block. The inter-frame predictor 110 may locate a prediction block pointed to by the motion vectors in one of the lists of reference pictures. The inter-frame predictor 110 may also generate syntax elements associated with picture blocks and video slices for use by the video decoder 200 when decoding picture blocks of video slices. Alternatively, in an example, the inter-frame predictor 110 performs a motion compensation process by using the motion information of each sub-block to generate a prediction block for each sub-block to obtain a prediction block for the current picture block. It will be understood that the inter-frame predictor 110 herein performs the motion estimation and motion compensation processes.

Specifically, after selecting an inter-frame prediction mode for the current picture block, the inter-frame predictor 110 may provide information indicating the selected inter-frame prediction mode of the current picture block to the entropy encoder 103, so that the entropy encoder 103 can encode the information indicating the selected inter-frame prediction mode.

The intra-frame predictor 109 may perform intra-frame prediction for the current picture block. Explicitly, the intra-frame predictor 109 may determine the intra-frame prediction mode used to encode the current block. for example, the intra-frame predictor 109 may use a bit rate-distortion analysis to calculate bit rate-distortion values for various intra-frame prediction modes to be tested, and select the intra-frame prediction mode with the best bit rate-distortion characteristic from among the modes to be tested.

In any case, after selecting an intra-frame prediction mode for a picture block, the intra-frame predictor 109 may provide information indicative of the selected intra-frame prediction mode for the current picture block to the entropy encoder 103, so that the entropy encoder 103 encodes the information indicative of the selected intra-frame prediction mode.

After the prediction processing unit 108 generates a prediction block of the current picture block by inter-frame prediction, intra-frame prediction, the video encoder 100 forms a residual picture block by subtracting the prediction block from the current picture block to be encoded. The summator 112 represents one or more components that perform the subtraction operation. The residual video data in the residual block may be contained in one or more transform units (TUs) and applied to the transformer 101. The transformer 101 transforms residual video data into residual transform coefficients by using a transform such as discrete cosine transform (DCT) or a conceptually similar transform. The transformer 101 can transform the residual video data from the pixel value domain to the transform domain, such as a frequency domain.

The transformer 101 may send the resulting transform coefficients to the quantizer 102. The quantizer 102 quantizes the transform coefficients to further reduce the bit code rate. In some examples, the quantizer 102 may then perform a scan of a matrix containing the quantized transform coefficients. Alternatively, the entropy encoder 103 may perform scanning.

After the quantization, the entropy encoder 103 entropy encodes the quantized transform coefficients. For example, the entropy encoder 103 may perform context adaptive variable length coding (CAVLC), context adaptive binary arithmetic coding (CABAC), syntax-based adaptive binary arithmetic coding (SBAC), probability interval partitioning entropy (PIPE) coding, or another entropy coding method or technique. After entropy encoding by the entropy encoder 103, the encoded code stream may be transmitted to the video decoder 200, or archived for later transmission or retrieved by the video decoder 200. The entropy encoder 103 may also entropy encode syntax elements of the current picture block to be encoded.

A de-quantizer 104 and a de-transformer 105 apply dequantization and de-transformation, respectively, to reconstruct the residual block in the pixel domain, such as a reference block for later use as a reference picture. The summator 111 adds the reconstructed residual block to the prediction block generated by inter-frame predictor 110 or intra-frame predictor 109 to produce the reconstructed picture block. The filter unit 106 may be adapted to the reconstructed picture block to reduce distortions, such as block artifacts. The reconstructed picture block is stored as a reference block in the decoded picture buffer 107, and the reconstructed picture block may be used as a reference block by the inter-frame predictor 110 to perform inter-frame prediction of blocks in subsequent video frames or pictures.

It will be understood that other structural variations of the video encoder 100 may be used to encode a video stream. For example, for some picture blocks or frames, the video encoder 100 may quantize the residual signals directly without being processed by the transformer 101, and accordingly, without being processed by the de-transformer 105; or, for some picture blocks or frames, the video encoder 100 does not generate residual data, and accordingly, does not need to process the residual signals by the transformer 101, the quantizer 102, the de-quantizer 104, and the de-transformer 105; or, the video encoder 100 may store the reconstructed picture block as a reference block directly without processing by the filter unit 106; or, the quantizer 102 and the de-quantizer 104 in the video encoder 100 may be combined together.

Figure 3:
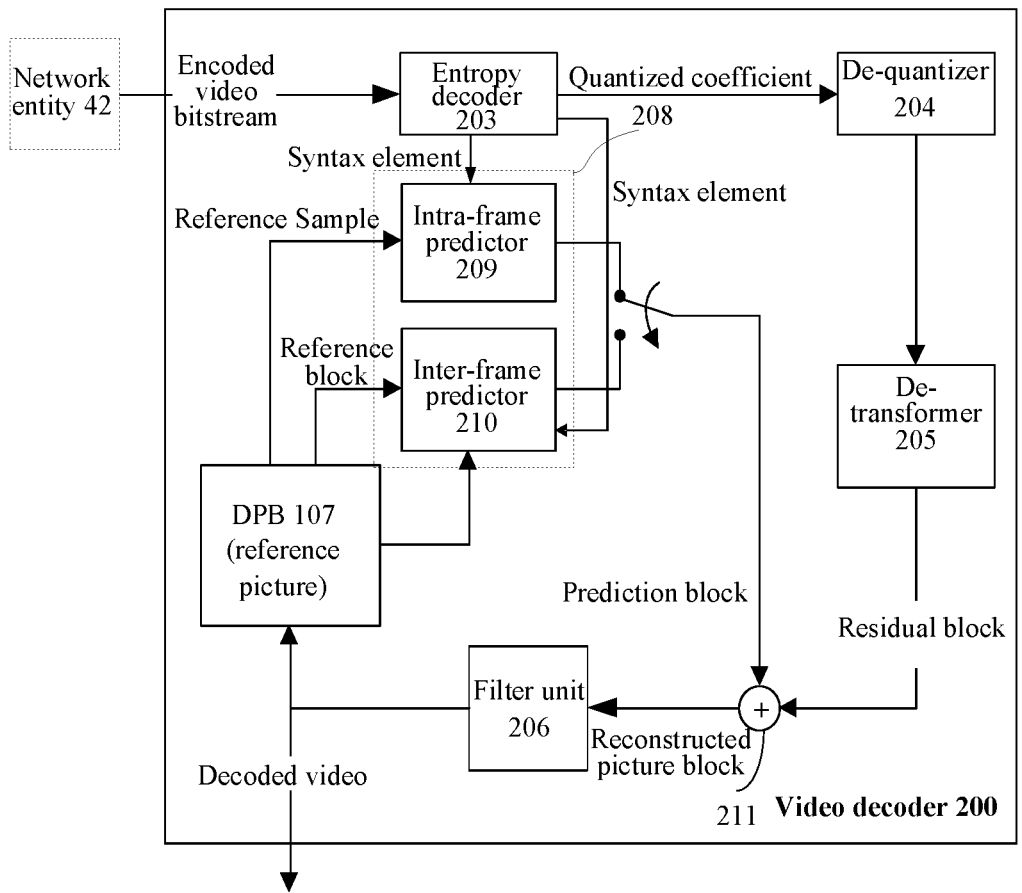
FIG. 3 is a block diagram illustrating a video decoder according to an embodiment of the present disclosure.

FIG. 3 is a block diagram illustrating a video decoder 200 according to an embodiment of the present disclosure. In the example of FIG. 3, the video decoder 200 includes an entropy decoder 203, a prediction processing unit 208, a de-quantizer 204, a de-transformer 205, a summator 211, a filter unit 206, and a decoded picture buffer (DPB) 207. The prediction processing unit 208 includes an inter-frame predictor 210 and an intra-frame predictor 209. In some examples, the video decoder 200 may perform a decoding process that is largely reversible with respect to the encoding process described with respect to the video encoder 100 in FIG. 2.

In the decoding process, the video decoder 200 receives from the video encoder 100 an encoded video code stream representing picture blocks of the encoded video slice and associated syntax elements. The video decoder 200 may receive video data from the network entity 42, and optionally, may store the video data in a video data memory (not shown in the figures). The video data memory may the store video data to be decoded (such as an encoded video code stream) by components of the video decoder 200. The video data stored in the video data memory may be obtained, for example, from the storage device 40, from a local video source such as a camera, via wired or wireless network communication of the video data, or by accessing physical data storage medium. The video data memory may serve as a decoded picture buffer for storing the encoded video data from the encoded video stream. Therefore, although the video data memory is not shown in FIG. 3, the video data memory and the DPB 207 may be the same memory or separately memories. The video data memory and the DPB 207 may be formed by any one of a variety of memory devices, for example, a dynamic random access memory (DRAM) including a synchronous dynamic random access memory (SDRAM), a magnetic random access memory (MRAM), a resistive random access memory (RRAM), or other types of memory devices.

The network entity 42 may be a server, a media-aware network element (MANE), a video editor/cutter, or other device for implementing one or more of the techniques described above. The network entity 42 may or may not include a video encoder, such as the video encoder 100. Before the network entity 42 sends the encoded video stream to the video decoder 200, the network entity 42 may implement a portion of the techniques described in the present disclosure. In some video decoding systems, the network entity 42 and the video decoder 200 may be a portion of a separate device, while in other cases, functionality described with respect to network entity 42 may be performed by the same device that includes the video decoder 200. In some embodiments, the network entity 42 may be an example of the storage device 40 of FIG. 1.

The entropy decoder 203 of the video decoder 200 entropy decodes the code stream to produce quantized coefficients and some syntax elements. The entropy decoder 203 forwards the syntax elements to the prediction processing unit 208. The video decoder 200 may receive syntax elements at the video slice level and/or at the picture block level.

When the video slice is decoded as an intra-frame decoded (I) slice, the intra-frame predictor 209 of the prediction processing unit 208 may generate a prediction block for the picture block of the current video slice based on the intra-frame prediction mode notified by the signaling and data from a previously decoded block of the current frame or picture. When the video slice is decoded as an inter-frame decoded (i.e., B or P) slice, the inter-frame predictor 210 of the prediction processing unit 208 may determine, based on syntax elements received from the entropy decoder 203, an inter-frame prediction mode for decoding a current picture block of the current video slice, and decode (e.g., perform an inter-frame prediction) the current picture block based on the determined inter-frame prediction mode. Specifically, the inter-frame predictor 210 may determine whether to predict the current picture block of the current video slice by using a new inter-frame prediction mode, and if the syntax elements indicate that a new inter-frame prediction mode is to be used to predict the current picture block, the current picture block of the current video slice is predicted based on the new inter-frame prediction mode (e.g., one of the new inter-frame prediction modes specified by the syntax elements or one of the default new inter-frame prediction modes) of the current picture block or a sub-block of the current picture block, thereby the predicted motion information of the current picture block or the sub-block of the current picture block is used to obtain or generate a predicted block of the current picture block or the sub-block of the current picture block through a motion compensation process. The motion information herein may include reference picture information and a motion vector, where the reference picture information may include, but is not limited to, unidirectional/bidirectional prediction information, a list number of reference pictures and a reference picture index corresponding to the list of reference pictures. For the inter-frame prediction, a prediction block may be generated from any one of the reference pictures within one of the lists of reference pictures. The video decoder 200 may construct the list of reference pictures based on the reference pictures stored in the DPB 207, i.e., list 0 and list 1. A reference frame index of the current picture may be included in one or more of the lists 0 and 1 of reference frames. In some examples, the video encoder 100 signals a notification indicating whether a new inter-frame prediction mode is used to decode a particular syntax element of a particular block. Alternatively, the video encoder 100 signals a notification indicating whether a new inter-frame prediction mode is used, as well as an indication of exactly which new inter-frame prediction mode is used to decode a particular syntax element of a particular block. It will be understood that the inter-frame predictor 210 herein performs a motion compensation process.

The de-quantizer 204 inverts quantization on, i.e. de-quantizes, the quantized transform coefficients provided in the code stream and decoded by the entropy decoder 203. The process of inverse quantization (de-quantization) may include: determining a degree of quantization to be applied by using quantization parameters calculated by the video encoder 100 for each picture block in the video slice and similarly determining a degree of inverse quantization to be applied. The de-transformer 205 applies an inverse transform to the transform coefficients, such as an inverse DCT, an inverse integer transform, or a conceptually similar inverse transform process, so as to produce a residual block in the pixel domain.

After the inter-frame predictor 210 generates a prediction block for the current picture block or a sub-block of the current picture block, the video decoder 200 obtains the reconstructed block, i.e., the decoded picture block, by summing the residual block from the de-transformer 205 with the corresponding prediction block generated by the inter-frame predictor 210. The summator 211 represents the component that performs this summation operation. A loop filter (in the decoding loop or after the decoding loop) may also be used to smooth pixel transform or otherwise improve video quality when desired. The filter unit 206 may represent one or more loop filters, such as a deblocking filter, an adaptive loop filter (ALF), and a sample adaptive offset (SAO) filter. Although the filter unit 206 is shown as an in-loop filter in FIG. 3, in other implementations, the filter unit 206 may be implemented as a after-loop filter. In an example, the filter unit 206 is adapted to reconstruct the block to minimize block distortion, and the result is output as a decoded video stream. Also, the decoded picture block in a given frame or picture may be stored in the DPB 207, and the reference picture for subsequent motion compensation may be stored via the DPB 207. The DPB 207 may be a part of a memory, which may also store the decoded video for later presentation on a display device (e.g., the display device 220 of FIG. 1), or may be separate from such a memory.

It will be understood that other structural variations of the video decoder 200 may be used to decode the encoded video stream. For example, the video decoder 200 may generate an output video stream without processing by the filter unit 206. Alternatively, for certain picture blocks or picture frames, the entropy decoder 203 of the video decoder 200 does not decode the quantized coefficients, and accordingly does not need to be processed by the de-quantizer 204 and the de-transformer 205.

The techniques of the present disclosure may be performed by either of a video encoder or a video decoder described herein, such as the video encoder 100 and the video decoder 200 described and shown in FIGS. 1 to 3. That is, in an embodiment, the video encoder 100 shown in FIG. 2 may perform the particular techniques described hereinafter when performing the inter-frame prediction during encoding of blocks of video data. In another embodiment, the video decoder 200 shown in FIG. 3 may perform the particular techniques described hereinafter when performing the inter-frame prediction during decoding of blocks of video data. Thus, references to a general "video encoder" or "video decoder" may include the video encoder 100, the video decoder 200, or another video encoding or decoding unit.

FIGS. 1 to 3 are only examples provided by the present disclosure, and in some examples, the video encoder 100, the video decoder 200, and the video coding system may include more or fewer components or units, without limitation of the present disclosure.

Figure 4:
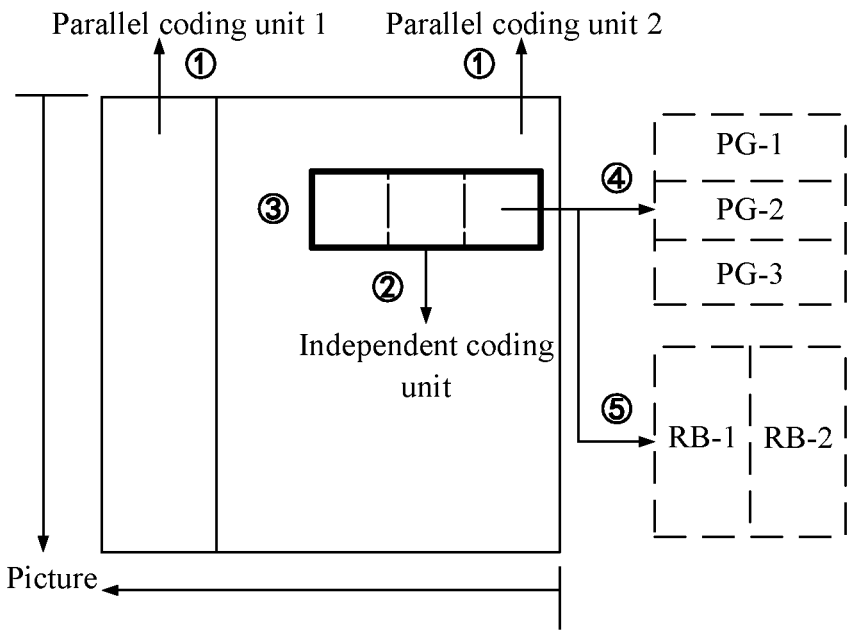
FIG. 4 is a flowchart illustrating a video encoding/decoding process according to an embodiment of the present disclosure.

Based on the video coding system illustrated in FIGS. 1 to 3, the present disclosure provides a possible video encoding/decoding realization, as shown in FIG. 4, which is a flowchart illustrating a video coding/decoding process according to an embodiment of the present disclosure. The video encoding/decoding realization includes processes ①  to ⑤, and the processes ① to 5 may be performed by one or more of the encoding side 10, the video decoder 100, the decoding side 20, or the video decoder 200.

In the process ①, a picture frame is divided into one or more parallel coding units that do not overlap each other. The one or more parallel coding units have no dependency on each other and can be encoded and decoded completely in parallel or independently, such as a parallel coding unit 1 and a parallel coding unit 2 shown in FIG. 4.

In the process ②, for each of the parallel coding units, the parallel coding unit can be divided into one or more independent coding units that do not overlap with each other, and each of the independent coding units can be independent of each other, but can share some parallel coding unit header information.

For example, the independent coding unit has a width of w_lcu and a height of h_lcu. If the parallel coding unit is divided into an independent coding unit, a size of the independent coding unit is identical to that of the parallel coding unit. Otherwise, the width of the independent coding unit will be greater than the height thereof (unless it is an edge region).

Typically, the independent coding unit may be a fixed w_lcu×h_lcu, with both w_lcu and h_lcu being the Nth power of 2 (N≥0), such as an independent coding unit with a size of 128×4, 64×4, 32×4, 16×4, 8×4, 32×2, 16×2, or 8×2, and so on.

As a possible example, the independent coding unit may be a fixed 128×4. If the size of the parallel coding unit is 256×8, the parallel coding unit may be equally divided into 4 independent coding units. If the size of the parallel coding unit is 288×10, the parallel coding unit is divided into: a first/second row of two independent coding units of 128×4 an one independent coding unit of 32×4, and a third row of two independent coding units of 128×2 and one independent coding unit of 32×2.

It is to be noted that the independent coding unit can include three components: a luminance Y, a chrominance Cb, and a chrominance Cr, or three components: a red (R), a green (G), and a blue (B), or only one of these components. If the independent coding unit includes three components, the sizes of the three components may be exactly the same or different, depending on the input format of the picture.

In the process ③, for each of the independent coding units, the independent coding unit can be divided into one or more coding units that do not overlap each other, and each of the coding units in the independent coding unit can be dependent on each other, e.g., multiple coding units can be cross-referenced to pre-encoding and pre-decoding.

If the coding unit has the same size as the independent coding unit (i.e., the independent coding unit is divided into only one coding unit), the size of the coding unit may be all the sizes described in process ②.

If the independent coding unit is divided into a plurality of coding units that do not overlap each other, examples of feasible divisions may be: horizontal equal division (the height of the coding unit is the same as that of the independent coding unit but the widths are different, for example, the width of the coding unit may be ½, ¼, ⅛, or 1/16, etc. of the width of the independent coding unit), vertical equal division (the width of the coding unit is the same as that of the independent coding unit and the heights are different, for example, the height of the coding unit may be ½, ¼, ⅛, or 1/16, etc. of the height of the independent coding unit), horizontal and vertical equal division (quadtree division), etc., preferably the horizontal equal division.

A coding unit has a width of w_cu and a height of h_cu, and the width is greater than the height (otherwise, it is an edge region). Typically, the coding unit can be a fixed w_cu×h_cu, with both w_cu and h_cu the Nth power of 2 (N≥0), e.g., 16×4, 8×4, 16×2, 8×2, 8×1, 4×1, etc.

For example, the coding unit may be a fixed 16×4. If the size of the independent coding unit is 64×4, the independent coding unit may be equally divided into four coding units. If the size of the independent coding unit is 72×4, the independent coding unit is divided as follows: four coding units of 16×4 and one coding unit of 8×4.

It is to be noted that the coding unit can include three components: a luminance Y, a chrominance Cb, and a chrominance Cr, (or a red (R), a green (G), and a blue (B)), or only one of these components. If three components are included, the sizes of these components can be exactly the same or different, depending on the input format of the picture.

It is to be noted that the process ③ is an optional step in the video encoding/decoding method, and the video encoder/decoder may encode/decode the residual coefficients (or residual values) of the independent coding units obtained in the process ②.

In the process ④, for the coding unit, it can be divided into one or more prediction groups (PGs) that do not overlap each other, a PG can be abbreviated as a group. Each of the PGs is encoded/decoded in accordance with a selected prediction mode to obtain the prediction value of the PG, such that the prediction values of all the PGs constitute a prediction value of the coding unit. Based on the prediction value and the original value of the coding unit, the residual value of the coding unit is obtained.

In the process ⑤, based on the residual value of the coding unit, the coding unit is grouped to obtain one or more residual blocks (RBs) that do not overlap each other. The residual coefficients of the RBs are encoded and decoded according to the selected mode to form the residual coefficient stream. Specifically, the residual coefficients may be transformed or not transformed.

The selected mode for the encoding and decoding method for the residual coefficient in the process ⑤ may include, but is not limited to, any of the following: a semi-fixed-length coding mode, an exponential Golomb encoding method, a Golomb-Rice encoding method, a truncated unary code encoding method, a run-length encoding method, a direct encoding of the original residual values, and the like.

For example, a video encoder can directly encode the coefficients in the RBs.

For example, the video encoder may transform the residual block, such as DCT, DST, Hadamard transform, etc., and then encode the transformed coefficients.

For example, when the RB is small, the video encoder may directly uniquely quantize the coefficients in the RBs, and then perform binary encoding. If the RB is large, the RB may be further divided into a plurality of coefficient groups (CG), the CGs are uniformly quantized, and the binary encoding is performed. In some embodiments of the present disclosure, the coefficient group (CG) and the quantization group (QG) may be the same.

The following is an exemplary illustration of the encoding for the residual coefficient in a semi-fixed-length encoding mode. The maximum value of the absolute value of the residual in an RB is defined as a modified maximum (mm). The number of encoding bits of the residual coefficient in the RB is determined, where the number of encoding bits of the residual coefficient in the same RB block is consistent. For example, if the critical limit (CL) of the current RB is 2, and the current residual coefficient is 1, two bits are needed to encode the residual coefficient 1, denoted 01. If the CL of the current RB is 7, that indicates as a residual coefficient with an encoding 8-bit and a sign bit with a 1-bit. The CL is determined by going for the smallest M value that satisfies that all residuals of the current sub-blocks are within $[-2^{(M-1)}, 2^{(M-1)}]$. If two boundary values $-2^{(M-1)}$ and $2^{(M-1)}$ exist, M will be increased by 1, i.e., M+1 bits are required to encode all the residuals of the current RB. If only one of the two boundary values $-2^{(M-1)}$ and $2^{(M-1)}$ exists, a Trailing bit is required to encode to determine whether the boundary value is $-2^{(M-1)}$ or $2^{(M-1)}$. If none of the residuals have either of −2^(M−1) and 2^(M−1), there is no need to encode this Trailing bit.

Furthermore, for some special cases, the video encoder may directly encode the original values of the picture instead of the residuals.

At present, for one or more coding units (CUs) included in a frame of picture, the encoding side obtains the quantization parameter (QP) of each CU, and encodes the CU according to the QP to obtain a code stream. Accordingly, the decoding side performs a dequantization on the code stream to obtain the QP of the CU, and decodes the CU according to the QP. The CUs are divided according to the picture content, and the encoding side and the decoding side use the same QP to quantize a picture content corresponding to a CU, which leads to large quantization distortion in the picture encoding and decoding process.

Specific examples of the present disclosure will be described in detail below in combination with accompanying drawings.

Figure 5:
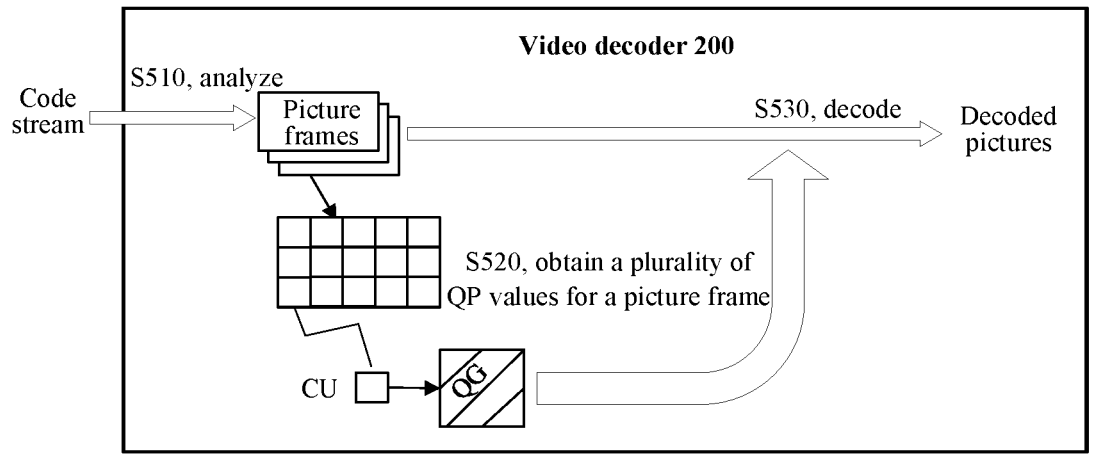
FIG. 5 is a flowchart illustrating a decoding method for a picture according to an embodiment of the present disclosure.

FIG. 5 is a flowchart illustrating a decoding method for a picture according to an embodiment of the present disclosure. The decoding method may be applied to the video coding system illustrated in FIG. 1. The decoding method may be performed by the decoding side 20, and specifically, the decoding method may be performed by a video decoder 200 included in the decoding side 20. Referring to FIG. 5, the decoding method provided by this embodiment includes the following steps S510 to S530.

At step S510, the video decoder 200 analyzes the obtained code stream to obtain one or more picture frames.

Each of the one or more picture frames (a picture frame) includes one or more coding units (CUs).

As shown in FIG. 5, a picture frame may include 3×5=fifteen CUs. It is to be noted that a picture frame can also include more CUs, such as twenty CUs. A picture frame can also include fewer CUs, such as one CU or two CUs.

At step S520, the video decoder 200 determines a plurality of quantization parameter (QP) values for the picture frame.

Where a CU includes a plurality of quantization groups (QGs), and a QG corresponds to a QP value.

The CU includes a plurality of residual coefficients, the QG includes a portion of the plurality of residual coefficients, and the portion of the plurality of residual coefficients share a same QP value.

It is to be noted that after the video encoder quantizes the residual coefficients during the encoding process, the residual coefficient is also referred to as a level value. In this art, the residual coefficient and the level value that can also be collectively referred to as the residual coefficient, are expressed by the residual coefficient, which is not limited thereto.

Compared to a large picture distortion caused by all the residual coefficients in a CU adopting the same QP value, in the decoding process of a video picture provided in the embodiments of the present disclosure, a CU may be divided into a plurality of QGs, with one or more residual coefficients in each QG sharing a same QP value, such that the video decoder may make a finer granularity of QP decisions for one or more CUs corresponding to a picture frame, and while guaranteeing a certain compression rate, the decoding distortion of the picture frame is reduced, and the authenticity and accuracy of the video picture decoding is improved.

In an embodiment, a QG may include one or more pixels, and each pixel has a corresponding residual coefficient.

In an embodiment, when a QG includes one pixel, the quantization process of the QG may also be referred to as adaptive point-by-point quantization of the picture frame. The point-by-point quantization may also be applicable in a CU that is not divided. The characteristic of the point-by-point quantization is to allow each pixel to use different QP, which is equivalent to refining the granularity of QP to pixel level. In this way, the dequantization is performed on the picture frame by using the point-by-point quantization method, such that the subjective quality of the picture frame can be greatly improved without changing the compression rate of the picture frame.

In an embodiment, when a QG includes a plurality of pixels, the residual coefficients corresponding to the plurality of pixels included in a QG may share a QP value.

In another embodiment, the CU may be determined by the video decoder 200 dividing a CU included in a picture frame according to a first rule to obtain a plurality of QGs.

The first rule includes a division domain and a division mode, where the division domain is a transform domain or a pixel domain, and the division mode includes at least one of uniform division and non-uniform division.

positions of the plurality of residual coefficients included in a CU are labeled by coordinates, which may include horizontal and vertical coordinates. For example, a position coordinate of a residual coefficient is (i,j), where i represents an abscissa and j represents an ordinate. Several examples are provided below to illustrate the first rule and the division of QG in the CU.

In a first possible example, if the type of domain partition is a transform domain, the process of the video decoder 200 dividing a CU to obtain a plurality of QGs includes: dividing a residual coefficient in the plurality of residual coefficients whose coordinate sum does not reach a first coordinate threshold into a first QG, and dividing a residual coefficient in the plurality of residual coefficients of which the coordinate sum reaches the first coordinate threshold into a second QG. A coordinate sum of is a sum of a horizontal coordinate and a vertical coordinate of a residual coefficient.

Figure 6:
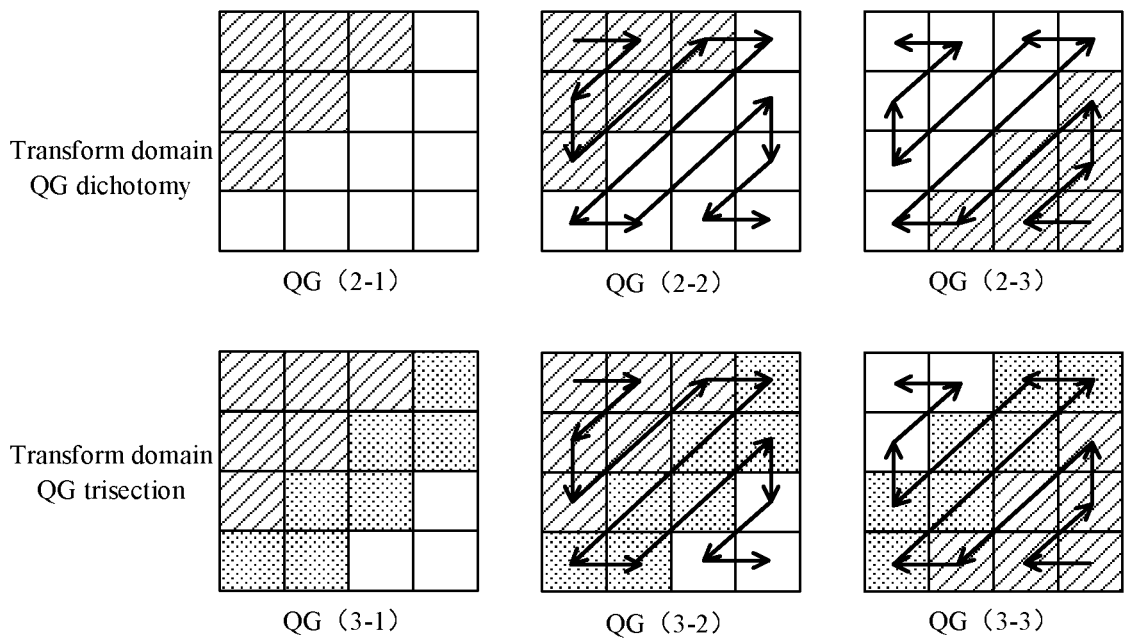
FIG. 6 is a schematic diagram illustrating a division of a transform domain according to an embodiment of the present disclosure.

FIG. 6 is a schematic diagram illustrating a division of a transform domain according to an embodiment of the present disclosure. A CU includes regions corresponding to sixteen residual coefficients, where the coordinates of the residual coefficient in the upper left corner are (1,1) and the coordinates of the residual coefficient in the lower right corner are (4,4).

QG (2-1) illustrates a QG dichotomy in the transform domain, where for a residual coefficient at a position (i,j), the residual coefficient that satisfies "i+j≤threshold 1" is in the first QG, and the others are in the second QG, e.g., the threshold 1 is 5.5. Alternatively, a residual coefficient that satisfies "i+j<threshold 1" is in the first QG, and the others is in the second QG.

In a second possible example, if the type of division domain is a transform domain, the process of the video decoder 200 dividing a CU to obtain a plurality of QGs includes: dividing a residual coefficient in the plurality of residual coefficients whose coordinate sum does not reach the first coordinate threshold into the first QG, dividing a residual coefficient in the plurality of residual coefficients whose coordinate sum reaches the first coordinate threshold and does not reach a second coordinate threshold into the second QG, and dividing a residual coefficient in the plurality of residual coefficients whose coordinate sum reaches the second coordinate threshold into a third QG. The second coordinate threshold is greater than the first coordinate threshold.

As shown in FIG. 6, QG (3-1) illustrates a QG trisection of the transform domain, where for a residual coefficient at a position (i,j), the residual coefficient that satisfies "i+j<threshold 1" is in the first QG, and a residual coefficient that satisfies "threshold 1≤i+j<threshold 2" is in the second QG, and a residual coefficient that satisfies "i+j≥threshold 2" is in the third QG. The threshold 2 is greater than the threshold 1, for example, the threshold 1=5.5, and the threshold 2=6.5.

Alternatively, a residual coefficient that satisfies "i+j≤threshold 1" is in the first QG, a residual coefficient that satisfies "threshold 1<i+j≤threshold 2" is in the second QG, and a residual coefficient that satisfies "i+j>threshold 2" is in the third QG. The threshold 2 is greater than the threshold 1, e.g., the threshold 1=5, and the threshold 2=6.

In a third possible example, if the type of division domain is a transform domain, the process of the video decoder 200 dividing a CU to obtain a plurality of QGs includes: ordering the plurality of residual coefficients, dividing residual coefficients in the plurality of residual coefficients that do not reach a first proportion threshold into a first QG, and dividing residual coefficients in the plurality of residual coefficients that reach the first proportion threshold into a second QG. The plurality of residual coefficients are ordered in any one of the following ways: zig-zag, and reverse zig-zag.

For example, as shown in FIG. 6, QG (2-2) illustrates a Zig-Zag way of bisecting the QG of the transform domain, where the first 7/16 (43.75%) of the residual coefficients are divided into the first QG, and the remaining residual coefficients are divided into the second QG.

For example, as shown in FIG. 6, QG (2-3) illustrates a Zig-Zag way of bisecting the QG of the transform domain, where the first 7/16 (43.75%) of the residual coefficients are divided into the first QG, and the remaining residual coefficients are divided into the second QG.

In a fourth possible example, if the type of division domain is a transform domain, the process of the video decoder 200 dividing a CU to obtain a plurality of QGs includes: ordering the plurality of residual coefficients, dividing a residual coefficient in the plurality of residual coefficients that does not reach the first proportion threshold into the first QG, dividing a residual coefficient in the plurality of residual coefficients that reaches the first proportion threshold and does not reach a second proportion threshold into the second QG, and dividing a residual coefficient in the plurality of residual coefficients that reaches the second proportion threshold into a third QG. The second proportion threshold is greater than the first proportion threshold.

For example, as shown in FIG. 6, QG (3-2) illustrates a Zig-Zag way of trisection QG of the transform domain, where the first 5/16 (31.25%) of the residual coefficients are divided to the first QG, the last 3/16 (18.75%) of the residual coefficients are divided to the second QG, and the remaining residual coefficients are divided to the third QG.

For example, as shown in FIG. 6, QG (3-3) illustrates a Zig-Zag way of QG trisection of the transform domain, where the first 5/16 (31.25%) of the residual coefficients are divided to the first QG, the last 3/16 (18.75%) of the residual coefficients are divided to the second QG, and the remaining residual coefficients are divided to the third QG.

The above first to fourth possible examples are only examples given in this embodiment for the purpose of illustrating the division of the transform domain in the CU, and should not be construed as a limitation of the present disclosure. When the type of division domain is a transform domain, the selection of the coordinate threshold and the proportion threshold may be determined according to the picture content of the CU or the needs of the video encoding and decoding, which is not limited by the present disclosure. Furthermore, in order to improve a accuracy of the QP decision in a CU, the transform domain may also be divided into more QGs, such as four, five, ten, or more, etc., which is not limited by the present disclosure.

When the type of division domain is a pixel domain, several possible examples are provided below to illustrate the first rule and the division of the QGs in the CU.

In a fifth possible example, the video decoder 200 symmetrically divides the plurality of residual coefficients in a horizontal direction or a vertical direction, to obtain two QGs that include the same number of residual coefficients. These two QGs include the residual coefficients in a proportion of 1:1.

Figure 7:
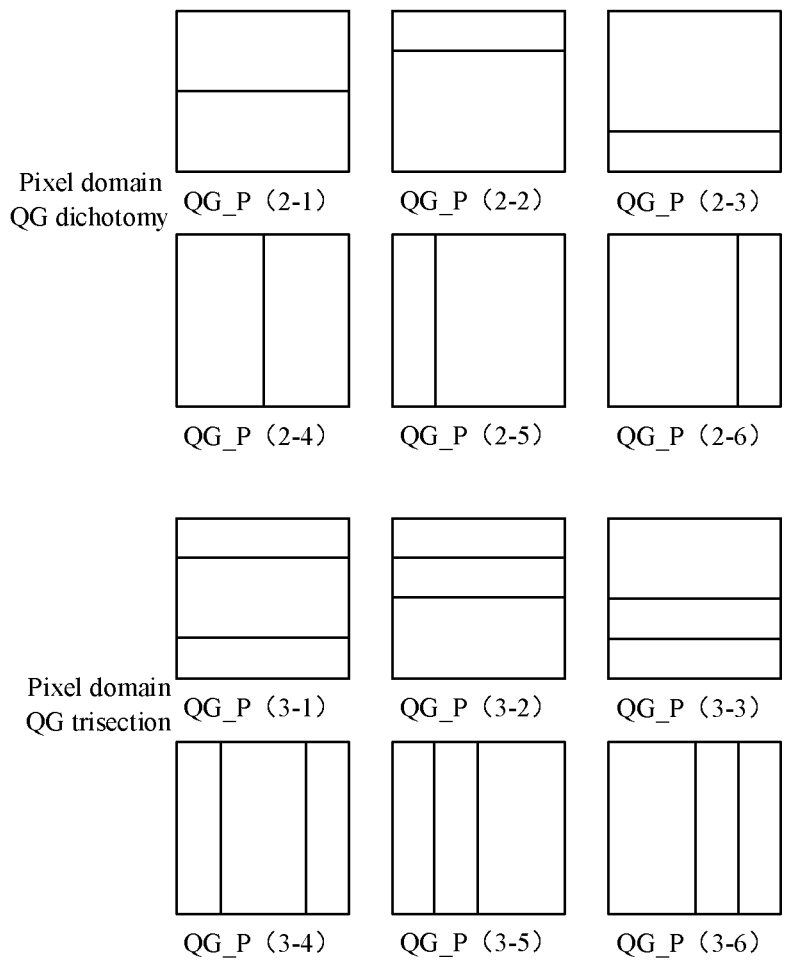
FIG. 7 is a schematic diagram illustrating a pixel domain division according to an embodiment of the present disclosure.

FIG. 7 is a schematic diagram illustrating a pixel domain division according to an embodiment of the present disclosure, with QG_pixel (pixel, P) (2-1) illustrating an example of symmetric bisection in a vertical direction of the CU, and QG_P (2-4) illustrating an example of symmetric bisection in a horizontal direction of the CU.

In the sixth possible example, the video decoder 200 symmetrically divides the plurality of residual coefficients in the horizontal direction or vertical direction to obtain three QGs. Two of the three QGs that are not adjacent to each other include the same number of residual coefficients, and the number of residual coefficients included in the other QG is the same as the sum of the number of residual coefficients included in the two QGs.

As shown in FIG. 7, QG_P (3-1) illustrates an example of a symmetric trisection in the vertical direction of the CU, where the QGs on both sides include the same number of residual coefficients, and the proportion of the number of residual coefficients included in the three QGs is 1:2:1. QG_P (3-4) illustrates an example of symmetric trisection in the vertical direction of the CU, and the proportion of the number of residual coefficients included in the three QGs is 1:2:1.

In a seventh possible example, the video decoder 200 symmetrically divides the plurality of residual coefficients in a horizontal direction or a vertical direction, to obtain two QGs that include different number of residual coefficients.

For example, as shown in FIG. 7, QG_P (2-2) illustrates an example of a symmetric bisection in the vertical direction of the CU, and the proportion of the number of residual coefficients included in the two QGs is 1:3.

For example, QG_P (2-3) illustrates an example of a symmetric bisection in the vertical direction of the CU, and the proportion of the number of residual coefficients included in the two QGs is 3:1.

For example, QG_P (2-5) illustrates an example of a symmetric bisection in the horizontal direction of the CU, and the proportion of the number of residual coefficients included in the two QGs is 1:3.

For example, QG_P (2-6) illustrates an example of a symmetric bisection in the vertical direction of the CU, and the proportion of the number of residual coefficients included in the two QGs is 3:1.

In an eighth possible example, the video decoder 200 symmetrically divides the plurality of residual coefficients in the horizontal direction or vertical direction to obtain three QGs. The three QGs include residual coefficients that do not have a symmetrical relationship.

For example, as shown in FIG. 7, QG_P (3-2) illustrates an example of a trisection in the vertical direction of the CU, and the proportion of the number of residual coefficients included in the three QGs is 1:1:2.

For example, QG_P (3-3) illustrates an example of a trisection in the vertical direction of the CU, and the proportion of the number of residual coefficients included in the three QGs is 2:1:1.

For example, QG_P (3-5) illustrates an example of a trisection in the horizontal direction of the CU, and the proportion of the number of residual coefficients included in the three QGs is 1:1:2.

For example, QG_P (3-6) illustrates an example of a trisection in the vertical direction of the CU, and the proportion of the number of residual coefficients included in the three QGs is 2:1:1.

The fifth to eighth possible examples are only examples given in this embodiment for the purpose of illustrating the division of the pixel domain in the CU, and should not be construed as a limitation of the present disclosure. When the type of division domain is a pixel domain, the proportion of residual coefficients included in the QG may be determined according to the picture content of the CU or the needs of video encoding and decoding, which is not limited by the present disclosure. Furthermore, in order to improve an accuracy of the QP decision in a CU, the pixel domain may also be divided into more QGs, such as four, five, ten, or more, etc., which is not limited by the present disclosure.

In this way, the video decoder 200 adopts different QG division modes for the residual coefficients in the pixel domain and the transform domain, and the QP quantization process is also different, thus the distortion of picture decoding is reduced. The process of QP quantification can be found in the description of the process of obtaining QP values herein and will not be repeated.

Referring to FIG. 5, after the video decoder 200 has obtained the plurality of QP values for the picture frame, the decoding method for the picture provided in the embodiment of the present disclosure further includes the following step S530.

At step S530, the video decoder 200 decodes the picture frame based on the plurality of QP values.

For example, the video decoder 200 decodes the picture frame according to the plurality of QP values to obtain a decoded picture. After the video decoder 200 decodes a plurality of picture frames, the decoded video of the code stream is obtained.

In the embodiments of the present disclosure, the video decoder may perform QP quantization for the picture decoding according to a QG as a granularity, and since a CU may be divided into a plurality of QGs and a QG corresponds to a QP value. Compared to a large picture distortion caused by all the residual coefficients in a CU adopting the same QP value, in the embodiments of the present disclosure, the video decoder may make a finer granularity of QP decisions for one or more CUs corresponding to a picture frame, and while guaranteeing a certain compression rate, the decoding distortion of the picture frame is reduced, and the authenticity and accuracy of the video picture decoding is improved.

Based on the technology provided in the present disclosure, in the process of video encoding/decoding, the video encoder/video decoder will obtain the QP value of each QG (or CU). Several possible implementations are provided herein.

In an embodiment, a QP value corresponding to a QG includes a luminance QP value and a chrominance QP value. The luminance QP value (QP_Y) refers to the QP value needed to quantize or dequantize the luminance of the picture frame, and the chrominance QP value refers to the QP value needed to quantize or dequantize the chrominance of the picture frame. For example, for step S520, the video decoder 200 determines the plurality of QP values for the picture frame.

In a first possible case, the video decoder 200 obtains a luminance QP value and a chrominance QP value for a QG, respectively.

In a second possible case, first, the video decoder 200 obtains the luminance QP value of the QG; secondly, the video decoder 200 determines the chrominance QP value of the QG based on the luminance QP value. For example, the chrominance QP value is QP_Y plus a QP offset value of the picture parameter set (PPS) layer and the slice layer.

For example, the luminance QP value and the chrominance QP value may be obtained by the video decoder 200 analyzing the code stream.

When performing a QP decision (or QP quantization) for a QG included in a CU, the video decoder 200 may first obtain the QP value for the CU level and then obtain the QP value for the QG level in the CU.

Two possible implementations for determining a plurality of QP values for a picture frame are provided below.

In a first possible implementation, direct encoding/decoding: the video decoder 200 analyzes the code stream to obtain label information for a picture frame that is used to indicate a QP value for a QG, and/or indicate a QP value for a CU.

For example, in near-lossless compression, the probability that a small QP value appears is higher than a large QP value, thus the video decoder 200 can de-quantize the residual coefficient (level value) included in the QG by using the QP value included in the label information carried by the code stream by means of truncated unary code, truncated Rice code or exponential Golomb code.

When the video encoder 200 makes a QP decision for a CU, the label information may carry a QP value for the CU. Without the need for QP decision for the QG in the CU, the video decoder 200 can determine the QP value of the CU based on the label information carried by the code stream, avoiding the video decoder from deducing the picture frame in the code stream to obtain the QP value of the CU, reducing the computational resource consumption of the video decoder, and improving the efficiency of picture decoding.

For example, when the video encoder 200 makes a QP decision for a plurality of QGs in a CU, the label information may carry a QP value for any one of the plurality of QGs.

For example, the label information may carry a QP value for the CU, and a QP value for any one of the QGs in the CU.

When the video encoder 200 makes a QP decision for a QG, the label information may carry the QP value of the QG, avoiding the video decoder from deducing the picture frame in the code stream to obtain the QP value of the QG, reducing the computational resource consumption of the video decoder, and improving the efficiency of picture decoding.

In a second possible implementation, predictive encoding/decoding: the video decoder 200 encodes a difference (deltaQP) between the actual (encoded) QP value and the predicted QP (predQP) value, which includes: firstly, obtaining the predQP of the current block (CU or QG); secondly, determining the deltaQP of the current block; and finally, determining the actual (encoded) QP value as QP=predQP+deltaQP.

Figure 8:
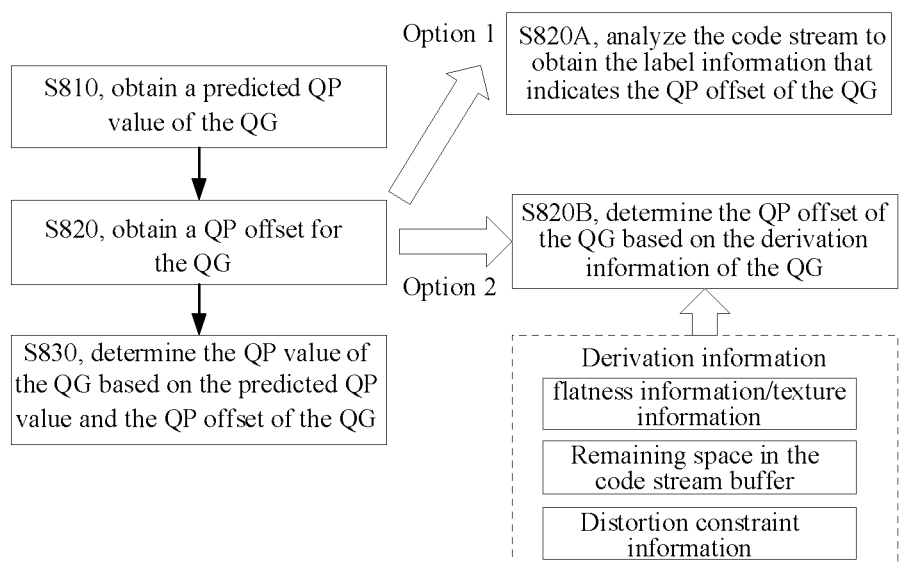
FIG. 8 is a flowchart illustrating a process of obtaining QP by predictive encoding according to an embodiment of the present disclosure.

Illustrated by the example of the video decoder 200 determining a QP value of a QG in a picture frame in detail below, as shown in FIG. 8, FIG. 8 is a flowchart illustrating a process of obtaining QP by predictive encoding according to an embodiment of the present disclosure.

The process of obtaining QP may be realized by a video decoder or a video encoder, and is illustrated herein with the video decoder 200 as an example, and the process of obtaining QP includes the following steps S810 to S820B.

At step S810, the video decoder 200 obtains the predicted QP value of the QG.

In an embodiment, the video decoder 200 determines the QP value of the CU in which the QG is as the predicted QP value for the QG. For example, the QP value of the CU may be determined by the video decoder 200 analyzing the label information of the code stream.

In another embodiment, the video decoder 200 may first obtain a QP value of at least one adjacent QG in the CU in which the QG is, where the at least one adjacent QG is adjacent to the QG, and the video decoder 200 may determine the predicted QP value of the QG based on the QP value of the adjacent QG. For example, the video decoder 200 determines the QP value of the adjacent QG as the predicted QP value of the QG.

At step S820, the video decoder 200 obtains a QP offset for the QG.

The QP offset may be represented by deltaQP herein.

Referring on to FIG. 8, with respect to S820, this embodiment provides two possible implementations.

In a first optional implementation, the video decoder 200 may utilize the label information carried by the code stream to determine the QP offset of the QG, as shown in S820A of FIG. 8.

At step S820A, the video decoder 200 analyzes the code stream to obtain the label information that indicates the QP offset of the QG.

For example, after obtaining the code stream, the video decoder 200 analyzes the code stream to obtain the label information of the picture frame in which the QG is, and the label information is configured to indicate the QP offset (deltaQP) of the QG.

In a second optional implementation, the video decoder 200 may utilize the derivation information to determine the QP offset of the QG, as shown in S820B of FIG. 8.

At step S820B, the video decoder 200 determines the QP offset of the QG based on the derivation information of the QG.

The derivation information may be one or more of: flatness information or texture information of the QG, remaining space of a code stream buffer, or distortion constraint information. The flatness information or texture information is configured to indicate a picture gradient of the QG. the distortion constraint information indicates a distortion threshold for any one of the plurality of QGs included in the picture frame. the remaining space of the code stream buffer is configured to indicate a usable remainder of the code stream buffer (e.g., buffer space).

In a first case, the derivation information is the flatness information or the texture information, and the video decoder 200 can derive the QP offset of the QG according to the flatness information or the texture information. For example, the video decoder 200 calculates the texture complexity of the current block (QG). For a QG with high texture complexity (such as reaching a texture complexity threshold), a large QP (such as 20) is used. For a QG with low texture complexity (such as not reaching the texture complexity threshold), a small QP (such as 5) is used.

In a second case, the derivation information is the remaining space in the code stream buffer, and the video decoder 200 calculates the average number of bits of all pixels of the whole picture ($BPP_{total}$), and the average number of bits of the remaining (left) un-encoded pixels ($BPP_{left}$). If $BPP_{left} > BPP_{total}$, the QP is decreased; otherwise, the QP is increased. The $BPP_{total}$ and the $BPP_{left}$ can be obtained by the following formula.

$$BBP_{total} = \frac{\text{Size of the initial space in the code stream buffer}}{\text{Number of pixels in the whole picture}}$$

$$BBP_{left} = \frac{\text{Size of the remaining space in the code stream buffer}}{\text{Number of the remaining un-encoded pixels in the whole picture}}$$

In a third case, if the derivation information is distortion constraint information, D represents the quantization distortion (the difference between the reconstructed value after dequantization and the residual before quantization), for any matrix A, $$\|A\|_{max_{i,j}} \stackrel{def}{=} \max_{i,j}|a_{ij}|$$

$$\|A\|_{\infty} \stackrel{def}{=} \max_{i}\sum_{j}|a_{ij}|$$

$$\|A\|_1 \stackrel{def}{=} \max_{j}\sum_{i}|a_{ij}|$$

(1) If quantization is performed on the residuals of the pixel domain, the sufficient necessary condition for the maximum distortion of the pixel domain not to exceed $\Delta$ is $\Delta \|D\|_{max} \leq$, from which the QP value of the pixel domain can be derived.

(2) If the residual in the transform domain is quantized, R represents the residual in the pixel domain, and U and V represent the horizontal transform matrix and the vertical transform matrix, respectively, the maximum distortion in the pixel domain and the maximum distortion in the transform domain meet the following formula. Therefore, the sufficient condition that the maximum distortion in the pixel domain does not exceed $\Delta$ is that the maximum distortion in the transform domain meet $$\|D\|_{max} \leq \frac{\Delta}{\|U^{-1}\|_{\infty}\|V^{-1}\|_1},$$

from which the QP value in the transform domain can be derived.

$$\|U^{-1}(URV+D)V^{-1} - R\|_{max} = \|U^{-1}DV^{-1}\|_{max} \leq \|U^{-1}\|_{\infty}\|D\|_{max}\|V^{-1}\|_1$$

Referring to FIG. 8, the process of obtaining the QP provided by this embodiment further includes the following step S830.

At step S830, the video decoder 200 determines the QP value of the QG based on the predicted QP value and the QP offset of the QG.

For example, the video decoder 200 determines the sum of the predicted QP value and the QP offset of the QG as the QP value of the QG.

It is to be noted that in the third case provided by the step S820B, when the video decoder 200 obtains the QP value of the QG, there are the following situations.

The video decoder 200 determines the corresponding predicted distortion based on the reference QP value of the QG. If the predicted distortion is less than or equal to the distortion threshold, the reference QP value is served as the QP value of QG. If the predicted distortion is greater than the distortion threshold, the QP value determined by the distortion threshold will be served as the QP value of the QG.

In an example 1, if the derivation information only includes the distortion constraint information, the reference QP value refers to the predicted QP value of the QG determined by the step S810.

In an example 2, if the derivation information includes the distortion constraint information and the texture information (or flatness information), the reference QP value may refer to a QP value obtained by adding the deltaQP determined by the texture information (or flatness information) and the predicted QP value determined by the step S810.

In an example 3, if the derivation information includes the distortion constraint information and the remaining space in the code stream buffer, the reference QP value may refer to a QP value obtained by adding the deltaQP determined by the remaining space in the code stream buffer and the predicted QP value determined by the step S810.

That is, the derivation information can be used to determine the deltaQP of the QG, or can be used to directly determine the actual encoding QP value of the QG. The specific use process of the derivation information can be determined according to the requirements of QP quantization/dequantization in the video encoding and decoding. The above-mentioned three cases and three examples should not be understood as limitations to the present disclosure.

The examples 1 to 3 are only examples of the present disclosure to illustrate that the video decoder 200 utilizes the derivation information to determine the QP value of the QG, and should not be construed as a limitation of the present disclosure. In other examples, the derivation information may include the distortion constraint information, the texture information (or flatness information), and the remaining space of the code stream buffer, which is not limited by the present disclosure.

It is to be noted that the examples of the chrominance QP value, the luminance QP value, the direct encoding, the predictive encoding, the code stream carrying the QP value, and the derivation information analyzing the QP value are only some examples provided by the present disclosure and should not be understood as a limitation of the present disclosure.

In an embodiment, the picture frame includes at least a first part of CUs and a second part of CUs, the first part of CUs and the second part of CUs do not have overlapping regions, and the QP values for the first part of CUs and the QP values for the second part of CUs are obtained in different ways. For example, the QP values of the first part of CUs are carried by the label information of the code stream, and the QP values of the second part of CUs is derived by the video decoder 200.

Specifically, the process of the video decoder 200 determining a plurality of QP values for a picture frame may include the following process: first, the video decoder 200 analyzes the code stream to obtain label information of the picture frame, the label information includes QP offsets of a first part of CUs, and the video decoder 200 determines QP values of the first part of CUs based on the label information; second, the video decoder 200, with respect to a second part of CUs, obtains predicted QP values of the second part of CUs, and the video decoder 200 further determines QP values of the second part of CUs based on the predicted QP values of the second part of CUs and the derivation information. Relevant content regarding the derivation information can be referred to the foregoing description of the derivation information of the QG, where it is sufficient to replace the QG with the CU, and will not be repeated herein.

For example, the video decoder 200 divides a picture into a plurality of regions, and applies different QP processing methods to the CUs of different regions. Baseline QP values for different regions are transmitted at the picture-level, and label information for different regions is transmitted at the CU-level. The CU-level QPs of the different regions can be obtained by means of code stream transmission or by means of derivation at the decoding side. For example, the video decoder divides the picture into a region of interest (ROI) and a non-ROI. For the CUs (first part of CUs) in the ROI, the QP values are obtained by the code stream transmission (such as the label information); for the CUs in the non-ROI (second part of CUs), the QP values are obtained by derivation at the decoding side (such as the derivation information).

In an implementation, one CU of one picture frame may include a plurality of QGs, and the QP quantization may be perform on a part of the plurality of QGs, or the QP quantization may be perform on all of the plurality of QGs.

For example, during the process of step S520, if all of the QGs included in the one CU of the one picture frame are quantized during the encoding process, the video decoder 200 may first determine a scanning order of all of the QGs included in the one CU of the one picture frame. Following this, the video decoder 200 obtains, for each of the QGs, a QP value for each of the QGs in the scanning order. The scanning order includes any of the following: top-to-bottom, left-to-right, zigzag, or reverse zigzag.

Specifically, if only some QGs are quantized and other QGs are not quantized, it is necessary to label the positions of these quantized QGs, and then obtain corresponding QPs for these quantized QGs. For example, a QP offset can be encoded for each of these quantized QGs.

As another example, during the process of step S520, if a part of QGs included in one CU of one picture frame is quantized during the encoding process, the video decoder 200 may analyze the code stream to determine the labeled one or more QGs in the one CU of the one picture frame, and the labeled one or more QGs need to be de-quantized during the decoding process, further, the video decoder 200 obtains a QP value for each of the labeled one or more QGs.

Specifically, if the quantization is to be performed for all QGs, a corresponding QP needs to be obtained for each of the QGs in turn according to a scanning order, where the scanning order is related to the division mode, which may be top-to-bottom, left-to-right, zigzag or reverse zigzag order. For example, a QP offset can be encoded for each of these quantized QGs.

In this way, for all of the QGs in one CU of one picture frame, the label information carried by the code stream can be utilized to distinguish the QP quantization mode (partial quantization or full quantization) for all of the QGs, avoiding the video decoder from performing the QP quantization indiscriminately, reducing the computational resources required for the video decoder to perform the QP quantization, and picture distortion, and improving the efficiency and accuracy of the video decoding.

In addition, when one QG includes only one pixel in one picture frame, one pixel corresponds to one QP value, and at least two pixels among all the pixels included in the one picture frame have different QP values, the process of the QP quantization of the pixel (with the point prediction mode)

may be performed by using a point-by-point quantization technique. For example, the point-by-point quantization technique includes the following process that: the video decoder 200 can adaptively adjust the QP value of the current pixel based on information of the reconstructed pixels surrounding the current pixel. The reconstructed pixel information includes, but is not limited to, a pixel value, flatness information or texture information, background luminance, contrast, and so on.

It is to be noted that the adaptive point-by-point quantization technique can be applied to a QG as well as a CU that is not divided into QGs. The characteristic of the point-by-point quantization is to allow each pixel in one picture frame to use different QP values, which is equivalent to refining the granularity of QP quantization to pixel level.

In an embodiment of the point-by-point quantization technique, $QP_{pred}$ represents the QP value of the current CU or QG, $QP_{JND} \geq 0$ represents the QP value corresponding to just noticeable distortion (JND), and offset>0 represents the QP offset value (which can be transmitted in the code stream or can be preset), and the QP value of the current pixel is adjusted to:

QP value of the current pixel =

$$\begin{cases} \min(QP_{pred}, QP_{JND}), & \text{average of flatness of the surrounding reconstructed pixels} \leq \text{threshold 1} \\ QP_{pred}, & \text{other} \\ QP_{pred} + \text{offset}, & \text{average of flatness of the surrounding reconstructed pixels} > \text{threshold 2} \end{cases}$$

where threshold 2>threshold 1, or

QP value of the current pixel =

$$\begin{cases} \min(QP_{pred}, QP_{JND}), & \text{average of flatness of the surrounding reconstructed pixels} \leq \text{threshold} \\ QP_{pred}, & \text{other} \end{cases}$$

The above two ways of determining the QP value of the current pixel are only examples provided by this embodiment and should not be understood as a limitation of the present disclosure.

In this way, the video decoder adopts the point-by-point quantization technique, which can substantially improve the subjective quality of the picture frame and reduce the distortion of the picture frame without changing the compression ratio of the picture frame.

An embodiment is provided below to illustrate the process of QP quantization of pixels in a picture frame.

For example, the video decoder 200 obtains a predicted QP value for a pixel and determines a QP value for a pixel based on the predicted QP value for the pixel and the derivation information.

In an embodiment, the predicted QP value of the pixel is the QP value of the CU or QG in which the pixel is. In another embodiment, a predicted QP value of a pixel is derived from the QP values of one or more reconstructed pixels surrounding the pixel, where the derivation method includes calculating at least one of: a mean (e.g., an average of QP values of the plurality of pixels), a median (e.g., a median of QP values of the plurality of pixels), or a mode (e.g., a QP value that occurs with the greatest frequency in the QP values of the plurality of pixels).

The derivation information for the pixel may be information for one or more reconstructed pixels surrounding the pixel. The information of the one or more reconstructed pixels includes one or more of: a pixel value, flatness information or texture information, background luminance, or contrast. It is to be noted that the foregoing information is provided only as examples of the present disclosure, and should not be understood as a limitation of the present disclosure.

Figure 9:
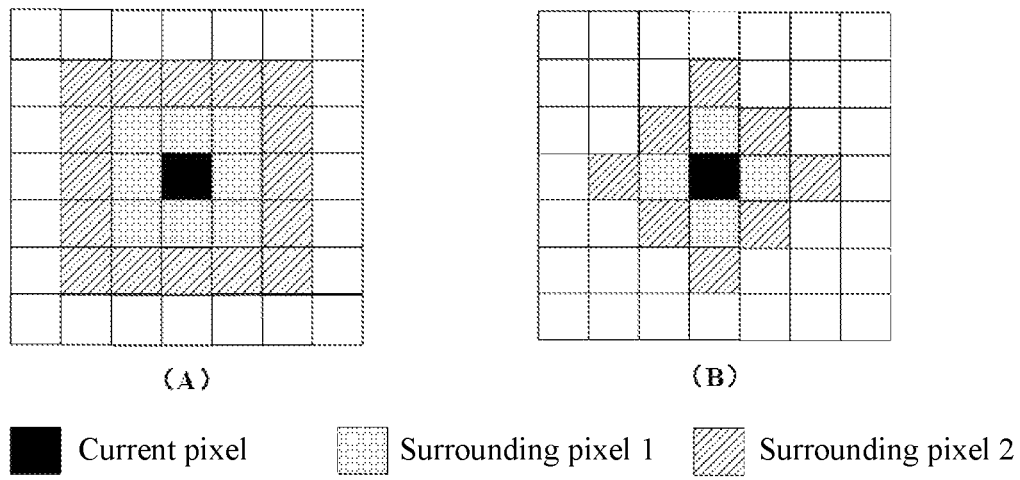
FIG. 9 is a schematic diagram illustrating distribution of pixels according to an embodiment of the present disclosure.

In addition, the wording "surrounding" may be understood as neighboring pixels of the pixel for which the QP value is to be determined, and several possible examples are provided herein for illustration. FIG. 9 is a schematic diagram illustrating a distribution of pixels provided in the present disclosure. (A) in FIG. 9 illustrates a division of a square region centered on the current pixel. As an example, two possible scenarios are given herein, in a scenario 1, the reconstructed pixels are pixels in a square region centered on the current pixel with a side length of 3, such as surrounding pixels 1 shown in (A) of FIG. 9; and in a scenario 2, the reconstructed pixels are pixels in a square region centered on the current pixel with a side length of 5, such as surrounding pixels 2 shown in (A) of FIG. 9.

(B) in FIG. 9 illustrates a division of a rhombus region centered on the current pixel. As an example, two possible scenarios are given herein, in a scenario 1, the reconstructed pixels are pixels in a rhombus region centered on the current pixel with a diagonal length of 3, such as surrounding pixels 1 shown in (B) of FIG. 9; and in a scenario 2, the reconstructed pixels are pixels in a rhombus region centered on the current pixel with a diagonal length of 5, such as surrounding pixels 2 shown in (B) of FIG. 9.

FIG. 9 is only an example of the present disclosure to illustrate the reconstructed pixels surrounding the current pixel and should not be understood as a limitation of the present disclosure. In another examples, the reconstructed pixels surrounding the current pixel may also refer to one or two pixels adjacent to the upper and lower sides, or left and right sides, of the current pixel.

In an embodiment, determining, based on the predicted QP value for the pixel and the derivation information, the QP value for the pixel includes: determining, based on the information of the one or more reconstructed pixels surrounding the pixel, indication information for the pixel; and when the indication information is less than or equal to a first threshold value, and the predicted QP value is greater than or equal to a QP value corresponding to just noticeable distortion, determining the QP value corresponding to the just noticeable distortion as the QP value for the pixel.

The first threshold value may be preset or may be determined based on a compression rate requirement or distortion rate requirement of the video encoding and decoding.

Furthermore, the first threshold may be determined based on input information from a user.

It is to be noted that the QP value corresponding to the just noticeable distortion is picture-level or CU-level information.

For example, the QP value corresponding to the just noticeable distortion is obtained by analyzing the code stream, such as a code stream that carries a QP value (e.g., 20) corresponding to the just noticeable distortion.

As another example, the QP value corresponding to the just noticeable distortion is derived from flatness information or texture information, background luminance, and contrast information of a surrounding reconstructed CU. The process of obtaining the QP value by deriving can be referred to the relevant parts of FIG. 9 above and will not be repeated herein.

In addition, the QP value corresponding to the just noticeable distortion can also be a preset value (such as 15) set by video encoder or the video decoder. That is, the QP value corresponding to the just noticeable distortion can not only be carried in the label information of the code stream, but also be obtained through analyzing the code stream by the video encoder or the video decoder during the video encoding and decoding process, and can also be a preset QP value. In the embodiments of the present disclosure, the QP value corresponding to the Just noticeable distortion is introduced into the QP value decision of the current pixel, so that each pixel meets judgment information corresponding to the just noticeable distortion, the picture distortion is reduced, and the subjective quality of the picture is improved.

Herein, a concrete example is provided to explain the process of determining the QP value of a pixel. As shown in Table 1, Table 1 shows a schematic diagram for determining the QP value of the interval bisection of the current pixel.

TABLE 1

| Interval bisection | ≤threshold | >threshold |
|---|---|---|
| Mode I | min($QP_{pred}$, $QP_{JND}$) | $QP_{pred}$ |
| Mode II | min($QP_{pred}$, $QP_{JND}$) | $QP_{pred}$ + offset |
| Mode III | $QP_{pred}$ | $QP_{pred}$ + offset |

Where offset>0 represents the QP offset value (which can be transmitted in the code stream or preset).

In the mode I, when the indication information is less than or equal to the threshold, the smaller value of $QP_{pred}$ and $QP_{JND}$ is served as the QP value of the current pixel; when the indication information is greater than the threshold, the predicted QP value ($QP_{pred}$) of the pixel is served as the QP value of the current pixel.

In the mode II, when the indication information is less than or equal to the threshold, the smaller value of $QP_{pred}$ and $QP_{JND}$ is served as the QP value of the current pixel; when the indication information is greater than the threshold, the sum of $QP_{pred}$ and the QP offset (offset) is served as the QP value of the current pixel.

In the mode III, when the indication information is less than or equal to the threshold, $QP_{pred}$ is served as the QP value of the current pixel; when the indication information is greater than the threshold, the sum of $QP_{pred}$ and the QP offset (offset) is served as the QP value of the current pixel.

It is to be noted that the foregoing examples as well as Table 1 are only exemplary ways of obtaining the QP value of the current pixel provided by the present disclosure, and should not be understood as a limitation of the present disclosure.

In the embodiments of the present disclosure, the QP value corresponding to the just noticeable distortion is introduced into the QP value decision of the current pixel, so that each pixel meets judgment information corresponding to the just noticeable distortion, the picture distortion is reduced, and the subjective quality of the picture is improved.

Figure 10:
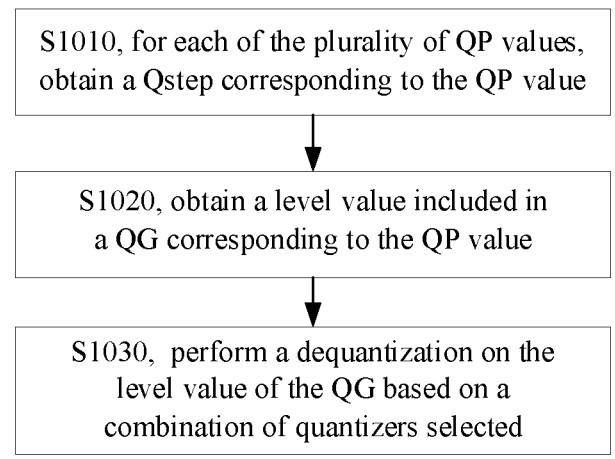
FIG. 10 is a flowchart illustrating a decoding process of a picture frame according to an embodiment of the present disclosure.

After the video decoder 200 obtains the QP value of a picture frame, with respect to step S530, the present disclosure provides a possible implementation. FIG. 10 is a flowchart illustrating a decoding process of a picture frame according to an embodiment of the present disclosure, and the step S530 may include the following steps S1010 to S1030.

At step S1010, for each of the plurality of QP values, a quantization step (Qstep) corresponding to the QP value is obtained.

The video decoder can obtain, based on the QP value, the Qstep by at least one of formula derivation and table lookup, and four embodiments are provided below.

Method 1: Qstep=2×QP+1.

Method 2: an octave represents a bit order of the QP, that is, if the QP increases by an octave, the Qstep doubles, and the octave may be 6 or 8. An offset represents an integer offset value.

$$Q_{step} = 2^{(QP+offset)/octave}$$

Method 3: an octave represents a bit order of the QP, that is, if the QP increases by an octave, the Qstep doubles, and the octave may be 6 or 8. An offset represents an integer offset value, $\lceil\ \rceil$, $\lfloor\ \rfloor$ means rounding up and rounding down respectively.

$$T \stackrel{def}{=} \left\lfloor \frac{QP}{octave} \right\rfloor + offset \geq 0$$

The Qstep is $Q_{step}=2^T$.

Method 4: An example of quantization and dequantization is provided below.

$$\text{Quantization: } l = \text{sign}(c) * floor\left(\frac{|c|}{Q_{step}} + f\right)$$

$$\text{Dequantization: } c' = l * Q_{step}$$

Where c represents a residual coefficient (in the transform domain or pixel domain) to be quantized, l represents a level value obtained after the quantization, c' represents a reconstructed value obtained after the dequantization, Qstep represents a quantization step, f ∈ [0,1) represents a parameter to control rounding, and [0,1−f) represents a quantization dead zone (an interval where the level value is 0).

f∈[0,1) represents a parameter to control rounding, {$c_j$} represents a residual coefficient to be quantized in the current QG or CU, and T can be obtained by using the formula in the method 3.

$$M \stackrel{def}{=} \max\left(1, \left\lceil \log_2\left(1 + \max_i |c_i|\right) \right\rceil\right)$$

When T<M, Qstep is obtained by the following formula, otherwise, the quantized coefficient and the reconstructed value are both zero.

$$Q_{step} = 2^T * \frac{1}{1-a}, a \in \left(\max\left(0, \frac{f*2^T - 1}{2^M - 1}\right), \frac{1}{2}\right]$$

In an embodiment of the method 4, a=f*$2^{T-M}$ or a=$2^{T-M}$, where M can be transmitted in the code stream or directly taken as a bit depth.

When quantizing the residual in the pixel domain, the method 3 needs a clip operation to ensure that the quantized coefficient can be represented by "M-T" bits, and the quantized coefficient in the method 4 can be represented by "M-T" bits naturally without the clip operation.

In addition, the solution for uniform quantization in JPEG-XS is to take f=0.5 in the method 4 and transmit M in the code stream.

It is to be noted that the larger the QP value, the larger the Qstep is, the coarser the quantization is, the larger the quantization distortion is, and the smaller the code rate of the coefficient encoding is. The parameter f is related to the length of the quantization dead zone, the smaller the f is, the longer the quantization dead zone is, and the closer the level value after the quantization is to zero. When f=0.5, the quantization formula and the dequantization formula provided in the method 4 of step S1010 are equivalent to rounding, and the quantization distortion is minimized. When f<0.5, the smaller the f is, the greater the quantization distortion is, and the smaller the code rate of the coefficient encoding is. In H.265: I picture f=⅓, and B/P picture f=⅙.

Referring to FIG. 8, the step S530 further includes the following steps S1020 and S1030.

At step S1020, a level value included in a QG corresponding to the QP value is obtained.

At step S1030, a dequantization is performed on the level value of the QG based on a combination of quantizers selected.

The combination of quantizers includes one or more quantizers, and each of the one or more quantizers is a uniform quantizer or a non-uniform quantizer.

For example, a uniform quantizer is a uniform scalar quantizer with a quantization or dequantization formula that may refer to the quantization formula and the dequantization formula provided in the method 4 of the step S1010 above, with the parameter f∈[0,1) taken as the following mode.

Mode 1: f can be 0.5 or other fixed value.

Mode 2: f can be adaptively determined based on the QP value, the prediction mode, and whether to transform.

As another example, a non-uniform quantizer is a non-uniform scalar quantizer, and the correspondence between the quantization level value, the quantization interval, and the reconstructed values after the dequantization can be obtained by looking up the table. An embodiment is shown in Table 2 below.

mode information or transform information, which is related to the distribution of the residual coefficients in the QG.

Performing the dequantization on the level value of the QG in step S1030 may include the following process.

First, a type of division domain of the QG is determined.

Second, if the type of division domain of the QG is a transform domain, a quantization matrix matching the parameter information of the QG is selected from the library of matrix templates at the decoding side.

The library of matrix templates includes a plurality of types of quantization matrix templates, and the parameter information includes one or more of a dimension of the QG, a dimension of a CU in which the QG is, luminance and chrominance channel information, or flatness information.

Finally, the dequantization is performed on the level value in the QG with the quantization matrix of the QG to obtain the residual coefficients of the QG.

The residual coefficients at different locations in the pixel domain are equally important, so the quantization matrix is not used. The coefficients in the transform domain include low-frequency coefficients and high-frequency coefficients. With the quantization matrix, the high-frequency coefficients and low-frequency coefficients can be quantized with different quantization steps, which can improve the subjective quality of the picture while ensuring a certain compression ratio.

Figure 11:
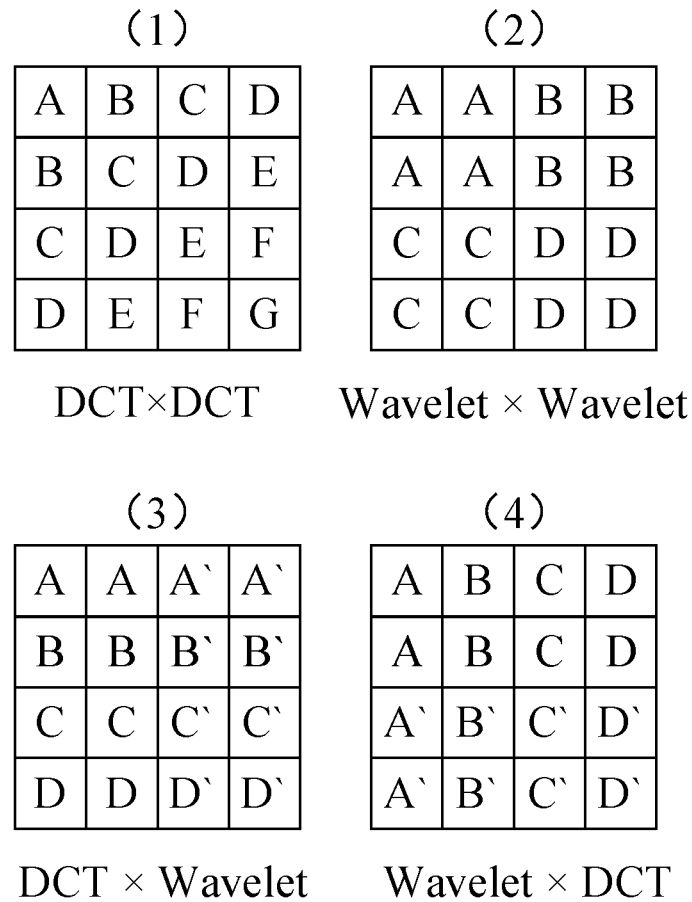
FIG. 11 is a schematic diagram illustrating a quantization matrix template according to an embodiment of the present disclosure.

The element distribution of the quantization matrix has a specific template, and the present disclosure allows different sizes of coding blocks to use different quantization matrix templates, and a large-size quantization matrix can be obtained by up-sampling one or more small-size quantization matrices. The quantization matrix templates included in the library of matrix templates are obtained by one or more types of the following transformation ways: discrete cosine transform (DCT), discrete sine transform (DST), integer transform, or discrete wave transform (DWT). FIG. 11 is a schematic diagram illustrating a quantization matrix template according to an embodiment of the present disclosure. The quantization matrix template may include the following.

(1) If both the horizontal and vertical directions are DCT/DST transforms (see (1) in FIG. 11), the coefficients on the same diagonal have the same frequency and adopt the

TABLE 2

| |Level value| | 0 | 1 | 2 | 3 | ... |
|---|---|---|---|---|---|
| Reconstructed value | $x_0$ | $x_1$ | $x_2$ | $x_3$ | ... |
| Quantization interval | $\left[0, \frac{x_0+x_1}{2}\right)$ | $\left[\frac{x_0+x_1}{2}, \frac{x_1+x_2}{2}\right)$ | $\left[\frac{x_1+x_2}{2}, \frac{x_2+x_3}{2}\right)$ | $\left[\frac{x_2+x_3}{2}, \frac{x_3+x_4}{2}\right)$ | ... |

$0 \leq x_0 < x_1 < x_2 < x_3 < \ldots$, the reconstructed value and the quantization interval are non-uniform, and the reconstructed value is a probability centroid of the quantization interval.

The combination of quantizers may employ a non-uniform scalar quantizer, or a plurality of non-uniform scalar quantizers.

The combination of quantizers is determined, for example, by the label information carried by the code stream.

As another example, the combination of quantizers is determined by the distribution of the residual coefficients in the QG. For example, the video decoder adaptively selects which quantizer to use, and the selection may be based on same quantization step, and the coefficients on different diagonals can adopt different quantization steps.

(2) If both horizontal and vertical directions are a wavelet transform (see (2) in FIG. 11), a quadtree template is used, the four sub-blocks correspond to a low frequency, a middle frequency, and a high frequency, the same quantization step is used for sub-blocks in the same frequency band, and different quantization steps can be used for sub-blocks in different frequency bands.

(3) If the DCT/DST transform is used in the vertical direction and the wavelet transform is used in the horizontal direction (see (3) in FIG. 11), the bisection in the vertical direction is performed, the left sub-blocks are the low frequency of wavelet transform and the right sub-blocks are the high frequency of wavelet transform. The upper side of the interior of each sub-block is the low frequency of the DCT/DST transform, and the lower side of the interior of each sub-block is the high frequency of the DCT/DST transform. Matrix elements A'/B'/C'/D' can be made equal to A/B/C/D plus the same offset value respectively.

(4) If the DCT/DST transform is used in the horizontal direction and the wavelet transform is used in the vertical direction (see (4) in FIG. 11), the bisection in the horizontal direction is performed, the upper sub-blocks are the low frequency of wavelet transform and the lower sub-blocks are the high frequency of wavelet transform. The left side of the interior of each sub-block is the low frequency of the DCT/DST transform, and the right side of the interior of each sub-block is the high frequency of the DCT/DST transform. Matrix elements A'/B'/C'/D' can be made equal to A/B/C/D plus the same offset value respectively.

In an embodiment, various types of quantization matrix templates included in the library of matrix templates may include flat block templates and texture block templates. The Qstep of the residual coefficient whose frequency is higher than the frequency threshold in the flat block template is greater than or equal to the Qstep of the residual coefficient whose frequency does not reach the frequency threshold in the flat block template. The Qstep of the residual coefficient whose frequency is higher than the frequency threshold in the texture block template is greater than or equal to the Qstep of the residual coefficient whose frequency does not reach the frequency threshold in the texture block template.

For example, the video decoder labels the current block as a flat block or a texture block according to the flatness information, and then designs a quantization matrix template according to the texture masking effect. (1) If the current block (QG) is a flat block, the Qstep of the high-frequency coefficient in the quantization matrix is greater than or equal to the Qstep of the low-frequency coefficient. Because the human eye is more sensitive to the low-frequency distortion of the flat block than the high-frequency distortion, the high-frequency coefficient allows greater loss. (2) If the current block (QG) is a texture block, the Qstep of the high-frequency coefficient in the quantization matrix is less than or equal to the Qstep of the low-frequency coefficient. Because human eyes are more sensitive to the high-frequency distortion of the texture block than the low-frequency distortion, the high-frequency coefficient of the texture block is protected first.

In other words, in the decoding method for the picture, the video decoder first obtains the QP and the Qstep of the QG, analyzes the level value from the code stream, and then adaptively selects the quantizer to de-quantize the level value to obtain the reconstructed value, so as to realize the decoding of the picture frame.

Compared to a large picture distortion caused by all the residual coefficients in a CU adopting the same QP value, in the decoding process of a video picture provided in the embodiments of the present disclosure, a CU may be divided into a plurality of QGs, with one or more residual coefficients in each QG sharing a same QP value, such that the video decoder may make a finer granularity of QP decisions for one or more CUs corresponding to a picture frame, and while guaranteeing a certain compression rate, the decoding distortion of the picture frame is reduced, and the authenticity and accuracy of the video picture decoding is improved.

Accordingly, in the encoding method for the picture, the video encoder first obtains the QP, the Qstep and the residual coefficient of the QG, adaptively selects the quantizer to quantize the residual coefficient, and then adjusts the quantization coefficient to obtain the level value, so as to realize the encoding of the picture frame.

Figure 12:
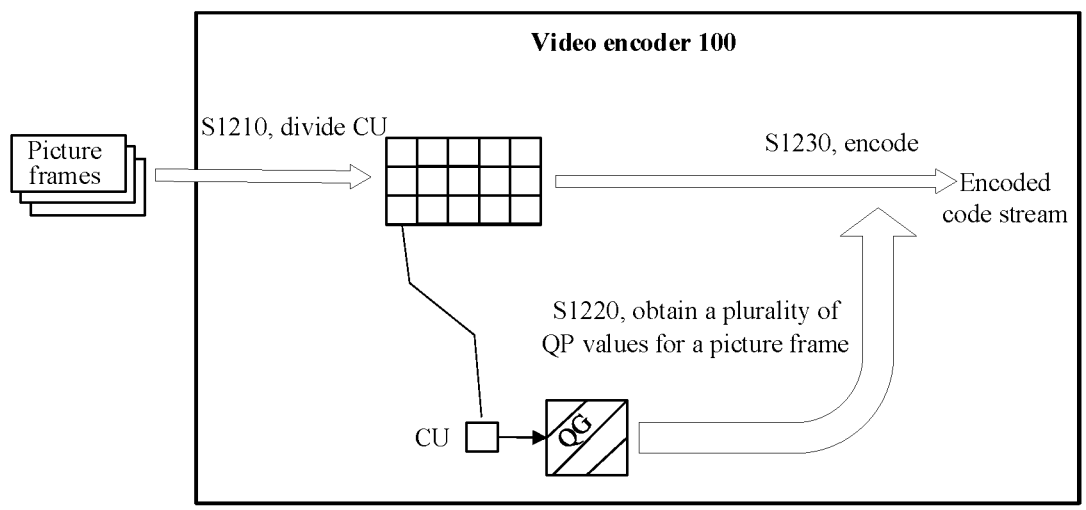
FIG. 12 is a flowchart illustrating an encoding method for a picture according to an embodiment of the present disclosure.

Based on the video encoder 100 illustrated in FIG. 2, the present disclosure also provides an encoding method for a picture (as shown in FIG. 12). FIG. 12 is a flowchart illustrating the encoding method for a picture according to an embodiment of the present disclosure. The encoding method can be performed by the video encoder 100, or can be performed by an encoding side (such as the encoding side 10 shown in FIG. 1) that supports the functions of the video encoder 100. Herein illustrated as an example of the video encoder 100 realizing the encoding method, the encoding method for the picture includes the following steps S1210 to S1230.

At step S1210, the video encoder 100 divides a picture frame into one or more coding units (CUs).

At step S1220, the video encoder 100 determines a plurality of quantization parameter (QP) values for the picture frame.

In an embodiment, a CU includes a plurality of quantization groups (QGs), and a QG corresponds to a QP value.

In another embodiment, a CU includes a plurality of pixels, a pixel corresponds to a QP value, and at least two of the plurality of pixels have different QP values.

At step S1230, the video encoder 100 encodes the picture frame based on the plurality of QP values.

The quantization of the QP value in the encoding method can be referred to the corresponding process in the decoding method in FIGS. 4 to 11, which will not be repeated herein.

Compared to a large picture distortion caused by all the residual coefficients in a CU adopting the same QP value, in the encoding process of a video picture provided in the embodiments of the present disclosure, a CU may be divided into a plurality of QGs (or pixels), with one or more residual coefficients in each QG sharing a same QP value, such that the video encoder may make a finer granularity of QP decisions for one or more CUs corresponding to a picture frame, and while guaranteeing a certain compression rate, the encoding distortion of the picture frame is reduced, and the authenticity and accuracy of the video picture encoding is improved.

It is to be understood that in order to realize the functions in the above-mentioned embodiments, the video encoder/video decoder includes hardware structures and/or software modules corresponding to performing the respective functions. Those skilled in the art will readily realize that the units and method steps of the various examples in the present disclosure can be implemented in the form of hardware or a combination of hardware and computer software. A function is performed as hardware or computer software driving hardware depends on the particular application scenarios and design constraints of the technical solution.

Figure 13:
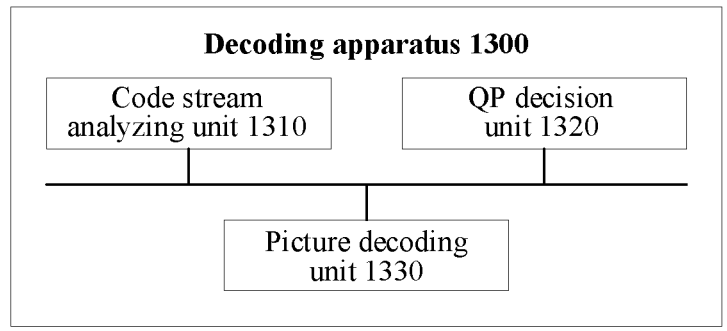
FIG. 13 is a schematic structural diagram illustrating a decoding apparatus according to an embodiment of the present disclosure.

FIG. 13 is a schematic structural diagram illustrating a decoding apparatus according to an embodiment of the present disclosure. The decoding apparatus 1300 includes a code stream analyzing unit 1310, a quantization parameter (QP) decision unit 1320 and a picture decoding unit 1330. The decoding apparatus 1300 can be used to realize the functions of a video decoder or a decoding side in the decoding method of the above-mentioned embodiments, so as to achieve the beneficial effects of the decoding method. In the embodiments of the present disclosure, the decoding apparatus 1300 may be the decoding side 20 or the video decoder 200 as shown in FIG. 1, or the video decoder 200 as shown in FIG. 3, or a module applied to the decoding side 20 or the video decoder 200.

The code stream analyzing unit 1310, the QP decision unit 1320 and the picture decoding unit 1330 are configured to implement the decoding method provided in any of the embodiments in FIGS. 4 to 11. Detailed descriptions of the code stream analyzing unit 1310, the QP decision unit 1320 and the picture decoding unit 1330 can be found by referring to the method embodiments shown in FIGS. 4 to 11, and will not be repeated herein.

Figure 14:
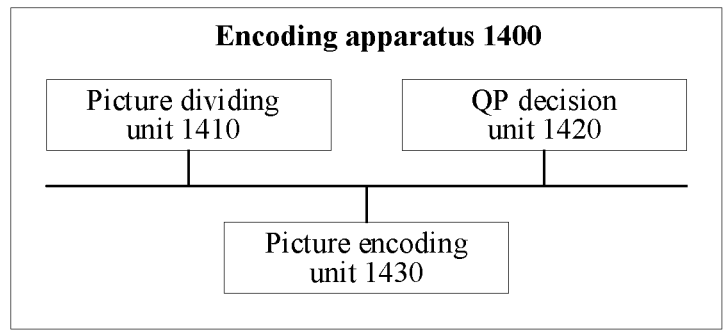
FIG. 14 is a schematic structural diagram illustrating an encoding apparatus according to an embodiment of the present disclosure.

FIG. 14 is a schematic structural diagram illustrating an encoding apparatus according to an embodiment of the present disclosure. The encoding apparatus 1400 includes a picture dividing unit 1410, a QP decision unit 1420 and a picture encoding unit 1430. The encoding apparatus 1400 can be used to realize the functions of a video encoder or an encoding side in the encoding method of the above-mentioned embodiments, so as to achieve the beneficial effects of the encoding method. In the embodiments of the present disclosure, the encoding apparatus 1400 may be the encoding side 10 or the video encoder 100 as shown in FIG. 1, or the video encoder 100 as shown in FIG. 2, or a module applied to the encoding side 10 or the video encoder 100.

The picture dividing unit 1410, the QP decision unit 1420 and the picture encoding unit 1430 are configured to implement the encoding method provided in any of the embodiments in FIG. 12. Detailed descriptions of the picture dividing unit 1410, the QP decision unit 1420 and the picture encoding unit 1430 can be found by referring to the method embodiments shown in FIGS. 4 to 12, and will not be repeated herein.

Compared to a large picture distortion caused by all the residual coefficients in a CU adopting the same QP value, in the decoding process of a video picture provided in the embodiments of the present disclosure, a CU may be divided into a plurality of QGs, with one or more residual coefficients in each QG sharing a same QP value, such that the video decoder may make a finer granularity of QP decisions for one or more CUs corresponding to a picture frame, and while guaranteeing a certain compression rate, the decoding distortion of the picture frame is reduced, and the authenticity and accuracy of the video picture decoding is improved.

Figure 15:
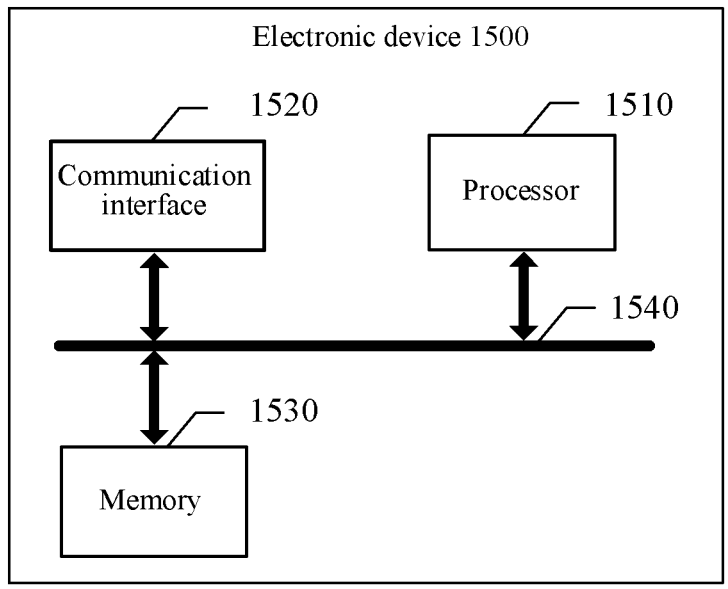
FIG. 15 is a schematic structural diagram illustrating an electronic device according to an embodiment of the present disclosure.

The present disclosure further provides an electronic device, as shown in FIG. 15. FIG. 15 is a schematic structural diagram illustrating the electronic device according to an embodiment of the present disclosure.

The electronic device 1500 includes the processor 1510 and the communication interface 1520. The processor 1510 and the communication interface 1520 are coupled to each other. It is to be understood that the communication interface 1520 can be a transceiver or an input/output interface. In an embodiment, the electronic device 1500 may also include a memory 1530 for storing instructions executed by the processor 1510 or for storing input data required by the processor 1510 to run the instructions or for storing data generated by the processor 1510 after running the instructions.

When the electronic device 1500 is used to realize the method shown in FIGS. 4 to 11, the processor 1510 and the communication interface 1520 are used to perform the functions of the code stream analyzing unit 1310, the QP decision unit 1320 and the picture decoding unit 1330.

When the electronic device 1500 is used to realize the method shown in FIG. 12, the processor 1510 and the communication interface 1520 are used to perform the functions of the picture dividing unit 1410, the QP decision unit 1420 and the picture encoding unit 1430.

The specific connection mediums between the communication interface 1520, the processor 1510 and the memory 1530 are not limited in the embodiments of the present disclosure. In the embodiment of the present disclosure, the communication interface 1520, the processor 1510 and the memory 1530 are connected by a bus 1540 in FIG. 15, and the bus is indicated by a thick line in FIG. 15. The connection modes of other components are only for schematic illustration and are not limited. The bus can include an address bus, a data bus, a control bus, and so on. For ease of representation, only a thick line is shown in FIG. 15, but it does not mean that there is only one bus or one type of bus.

The memory 1530 may be used to store software programs and modules, such as program instructions/modules corresponding to the decoding method or the encoding method provided by embodiments of the present disclosure, and the processor 1510 performs various functional applications as well as data processing by executing the software programs and modules stored in the memory 1530. The communication interface 1520 can be used for signaling or data communication with other devices. The electronic device 1500 in the present disclosure may have a plurality of communication interfaces 1520.

It will be understood that the processor in the embodiment of the present disclosure can be a central processing unit (CPU), a neural processing unit (NPU) or a graphic processing unit (GPU). the processor can also be other general-purpose processors, a digital signal processor (DSP), an application specific integrated circuits (ASIC), a field programmable gate array (FPGA) or other programmable logic devices, transistor logic devices, hardware components or any combination thereof. The general-purpose processor may be a microprocessor or any conventional processor or the like.

The method steps in the embodiments of the present disclosure may be realized by means of hardware or by means of a processor executing software instructions. The software instructions may include corresponding software modules, which may be stored in a random access memory (RAM), a flash memory, a read-only memory (ROM), a programmable ROM (PROM), an erasable PROM (EPROM), an electrically EPROM (EEPROM), a register, a hard disk, a removable hard disk, CD-ROM, or any other form of storage media known in the art.

An exemplary storage medium is coupled to a processor so that the processor can read information from and write information to the storage medium. Of course, the storage medium may also be an integral part of the processor. The processor and the storage medium may be located in an application specific integrated circuit (ASIC). In addition, the ASIC can be located in a network device or a terminal device. Of course, the processor and the storage medium may also be present as discrete components in the network device or the terminal device.

In the above examples, it can be implemented in whole or in part by software, hardware, firmware, or any combination thereof. When implemented in software, it can be implemented in whole or in part in the form of a computer program product. The computer program product includes one or more computer programs or instructions. When computer programs or instructions are loaded and executed on a computer, the processes or function according to the examples of the present disclosure are generated in whole or in part. The computer may be a general-purpose computer, a specialized computer, a computer network, a network device, a user device, or other programmable device. The computer programs or instructions can be stored in a computer-readable storage medium or transmitted from one computer-readable storage medium to another computer-readable storage medium, for example, the computer programs or instructions can be transmitted from a website site, a computer, a trajectory prediction device or a data center via wire or wireless to another website, a computer, a trajectory prediction device, or a data center. The computer-readable storage medium can be any available medium that can be accessed by a computer or a data storage device including one or more available devices, data centers, and the like. The available medium may be a magnetic medium (e.g., a floppy disk, a hard disk, a magnetic tape), an optical medium (e.g., a digital video disc (DVD)), or a semiconductor medium (e.g., a solid state drive (SSD)).

In various embodiments of the present disclosure, if there is no special explanation and logical conflict, the terms and/or descriptions between different embodiments are consistent and can be quoted from each other, and the technical features in different embodiments can be combined to form a new embodiment according to their inherent logical relationship. In the present disclosure, "at least one" means one or more, and "more than one" means two or more. The wording "and/or" describes an association relationship of an associated object, and indicates that three relationships may exist, e.g., A and/or B, which may be expressed as: A alone, both A and B, and B alone, where A, and B can be singular or plural. In the present disclosure, the character "/" generally indicates that the related object before and after is an "or" relationship. In the formulas of the present disclosure, the character "/" indicates that the related objects before and after are in a "division" relationship.

It will be understood that various numerical numbers involved in the embodiments of the present disclosure are only for the convenience of description and are not used to limit the scope of the embodiments of the present disclosure. sizes of serial numbers in the above each process do not mean an implementation sequence, and the implementation sequence of each process should be determined by its functions and internal logic.

The invention claimed is:

1. A decoding method for a picture, performed by a decoding device, the decoding method comprising:
    analyzing a code stream to obtain one or more picture frames, wherein a picture frame comprises one or more coding units (CUs);
    determining a plurality of quantization parameter (QP) values for the picture frame, wherein, for each QP value of the plurality of QP values, the QP value is for obtaining a quantization step (Qstep) corresponding to the QP value, a CU of the one or more CUs comprises a plurality of quantization groups (QGs), each of the plurality of QGs comprises a respective one pixel of the picture frame, each of the plurality of QGs corresponds to a respective QP value in the plurality of QP values, and at least two of the plurality of QGs correspond to different QP values; and
    decoding, based on the plurality of QP values, the picture frame.

2. The method of claim 1, further comprising, before determining the plurality of QP values for the picture frame:
    dividing, based on a first rule, the CU comprised in the picture frame to obtain the plurality of QGs, wherein the first rule comprises a division domain and a division mode, the division domain is a pixel domain, and the division mode comprises uniform division.

3. The method of claim 1, wherein the respective QP value comprises a luminance QP value and a chrominance QP value, and
    wherein determining the plurality of QP values for the picture frame comprises:
        obtaining the luminance QP value and the chrominance QP value of the QG, respectively; or
        obtaining the luminance QP value of the QG, and determining, based on the luminance QP value, the chrominance QP value of the QG.

4. The method of claim 1, wherein decoding, based on the plurality of QP values, the picture frame comprises:
    obtaining, for each of the plurality of QP values, a quantization step (Qstep) corresponding to the QP value;
    obtaining a level value comprised in a QG corresponding to the QP value; and
    performing a dequantization on the level value of the QG based on a combination of quantizers selected, wherein the combination of quantizers comprises one or more quantizers.

5. The method of claim 4, wherein the combination of quantizers is determined by label information carried by the code stream, or by distribution of residual coefficients in the QG.

6. The method of claim 4, wherein each of the one or more quantizers is a uniform quantizer or a non-uniform quantizer.

7. An encoding method for a picture, performed by an encoding device, the encoding method comprising:
    dividing a picture frame into one or more coding units (CUs);
    determining a plurality of quantization parameter (QP) values for the picture frame, wherein, for each QP value of the plurality of QP values, the QP value is for obtaining a quantization step (Qstep) corresponding to the QP value, a CU of the one or more CUs comprises a plurality of quantization groups (QGs), each of the plurality of QGs comprises a respective one pixel of the picture frame, each of the plurality of QGs corresponds to a respective QP value in the plurality of QP values, and at least two of the plurality of QGs correspond to different QP values; and
    encoding, based on the plurality of QP values, the picture frame.

8. A video coding system, comprising:
    an encoding device; and
    a decoding device, wherein the encoding device is communicatively connected to the decoding device,
    wherein the encoding device is configured to:
        divide a picture frame into one or more coding units (CUs);
        determine a plurality of quantization parameter (QP) values for the picture frame; and
        encode, based on the plurality of QP values, the picture frame,
    wherein the decoding device is configured to:
        analyze a code stream to obtain one or more picture frames, wherein the one or more picture frames comprise the picture frame that comprises the one or more CUs;
        determine the plurality of QP values for the picture frame; and
        decode, based on the plurality of QP values, the picture frame,
    wherein, for each QP value of the plurality of QP values, the QP value is for obtaining a quantization step (Qstep) corresponding to the QP value a CU of the one or more CUs comprises a plurality of quantization groups (QGs), each of the plurality of QGs comprises a respective one pixel of the picture frame, each of the plurality of QGs corresponds to a respective QP value in the plurality of QP values, and at least two of the plurality of QGs correspond to different QP values.

9. An electronic device, comprising at least one processor and at least one memory for storing computer instructions, wherein the computer instructions, when executed by the at least one processor, cause the at least one processor to perform the method of claim 1.

10. An electronic device, comprising at least one processor and at least one memory for storing computer instructions, wherein the computer instructions, when executed by the at least one processor, cause the at least one processor to perform the method of claim 7.

11. A non-transitory computer-readable storage medium, storing computer programs or instructions thereon, wherein the computer programs or instructions, when executed by an electronic device, cause the electronic device to perform the method of claim 1.

12. A non-transitory computer-readable storage medium, storing computer programs or instructions thereon, wherein the computer programs or instructions, when executed by an electronic device, cause the electronic device to perform the method of claim 7.

* * * * *